(12) United States Patent
Kaneda et al.

(10) Patent No.: US 11,932,092 B2
(45) Date of Patent: Mar. 19, 2024

(54) POWER DOOR DEVICE

(71) Applicant: HONDA MOTOR CO., LTD., Tokyo (JP)

(72) Inventors: Toshihiro Kaneda, Tokyo (JP); Mitsunori Nishino, Tokyo (JP); Nobuyuki Kishikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/174,896

(22) Filed: Feb. 27, 2023

(65) Prior Publication Data

US 2023/0304351 A1 Sep. 28, 2023

(30) Foreign Application Priority Data

Mar. 24, 2022 (JP) ................................ 2022-048780

(51) Int. Cl.
| | | |
|---|---|---|
| *E05F 15/616* | (2015.01) | |
| *B60J 5/04* | (2006.01) | |
| *E05F 15/41* | (2015.01) | |
| *E05F 15/622* | (2015.01) | |

(52) U.S. Cl.
CPC ............. *B60J 5/0472* (2013.01); *E05F 15/41* (2015.01); *E05F 15/622* (2015.01)

(58) Field of Classification Search
CPC ....... B60J 5/0472; E05F 15/41; E05F 15/622; E05Y 2400/336; E05Y 2900/531
See application file for complete search history.

(56) References Cited

U.S. PATENT DOCUMENTS

| | | | | |
|---|---|---|---|---|
| 11,536,062 | B2* | 12/2022 | Miyashiro | E05C 17/006 |
| 2013/0144495 | A1* | 6/2013 | Yu | E05F 15/70 |
| | | | | 701/49 |
| 2020/0224469 | A1* | 7/2020 | Miyashiro | E05C 17/203 |
| 2020/0224476 | A1* | 7/2020 | Kito | E05F 5/00 |

FOREIGN PATENT DOCUMENTS

| | | |
|---|---|---|
| JP | 2004-346618 A | 12/2004 |
| JP | 2007-238014 A | 9/2007 |
| JP | 2011-132685 A | 7/2011 |
| JP | 2015-014126 A | 1/2015 |
| JP | 2020-111135 A | 7/2020 |

OTHER PUBLICATIONS

Decision to Grant, Patent Application JP 2022-048780, 2 pages.

* cited by examiner

*Primary Examiner* — Sisay Yacob
(74) *Attorney, Agent, or Firm* — Rankin, Hill & Clark LLP

(57) ABSTRACT

A power door device includes: a motor actuator to open/close a vehicle door; a controller to control driving of the motor actuator and include an abnormal state dealing unit; an information unit to acquire information about a vertical vehicle acceleration, and a motor load for the motor actuator; and a diagnostic unit to generate an abnormal signal when the motor load exceeds a predetermined load threshold and when the vertical acceleration does not exceed an predetermined acceleration threshold. When the motor load exceeds the load threshold and the vertical vehicle acceleration does not exceed a predetermined acceleration threshold, the diagnostic unit diagnoses an abnormality generates the abnormal signal. The abnormal state dealing unit performs the abnormal dealing control including stop movement during the door opening/closing in response to the abnormal signal.

13 Claims, 9 Drawing Sheets

FIG. 3G

| | DURING AUTO-OPENING | DURING AUTO-CLOSING |
|---|---|---|
| SLOPE IN FRONT-REAR DIRECTION — TILTED FORWARD AND UPWARD | INCREASE CORRECTION FOR MOTOR LOAD CURRENT THRESHOLD IN RESPONSE TO FRONT-REAR TILT ANGLE AND DEGREE OF DOOR OPENING | DECREASE CORRECTION FOR MOTOR LOAD CURRENT THRESHOLD IN RESPONSE TO FRONT-REAR TILT ANGLE AND DEGREE OF DOOR OPENING |
| SLOPE IN FRONT-REAR DIRECTION — TILTED FORWARD AND DOWNWARD | DECREASE CORRECTION FOR MOTOR LOAD CURRENT THRESHOLD IN RESPONSE TO FRONT-REAR TILT ANGLE AND DEGREE OF DOOR OPENING | INCREASE CORRECTION FOR MOTOR LOAD CURRENT THRESHOLD IN RESPONSE TO FRONT-REAR TILT ANGLE AND DEGREE OF DOOR OPENING |
| SLOPE IN LEFT-RIGHT DIRECTION — DOOR POSITIONED UPWARD | INCREASE CORRECTION FOR MOTOR LOAD CURRENT THRESHOLD IN RESPONSE TO LEFT-RIGHT TILT ANGLE AND DEGREE OF DOOR OPENING | DECREASE CORRECTION FOR MOTOR LOAD CURRENT THRESHOLD IN RESPONSE TO LEFT-RIGHT TILT ANGLE AND DEGREE OF DOOR OPENING |
| SLOPE IN LEFT-RIGHT DIRECTION — DOOR POSITIONED DOWNWARD | DECREASE CORRECTION FOR MOTOR LOAD CURRENT THRESHOLD IN RESPONSE TO LEFT-RIGHT TILT ANGLE AND DEGREE OF DOOR OPENING | INCREASE CORRECTION FOR MOTOR LOAD CURRENT THRESHOLD IN RESPONSE TO LEFT-RIGHT TILT ANGLE AND DEGREE OF DOOR OPENING |

## POWER DOOR DEVICE

TECHNICAL FIELD

The present invention relates to a power door device configured to open/close a door of a vehicle.

BACKGROUND ART

Conventionally, a power door device is known to open and close a door(s) of a vehicle (see JP2004-346618A).

The power door device in JP2004-346618A discloses a technology for calculating the current value of an electric motor configured to drive the opening/closing of a back door, and using the calculated current value to detect an overload condition such as object contact and/or insertion.

In detail, the power door device in JP2004-346618A calculates the first and second derivative values based on the calculated current value. The first derivative value indicates a change in the current value during the first period, and the second derivative value indicates a change in the current value during the second period, which is shorter than the first period. The first derivative value may exceed a predetermined load threshold, and the second derivative value may then exhibit an upward trend. This case is determined to be under overloaded conditions. On the other hand, the second derivative may exhibit a downward trend. This case is determined such that the backdoor has a load change due to an external disturbance (not under overload conditions).

The power door device in JP2004-346618A makes it possible to reliably detect, with a low load and in a short time, a backdoor overload condition while avoiding a misjudgment due to an external disturbance.

SUMMARY OF INVENTION

Technical Problem

Here, the power door device in JP2004-346618A detects door-related overload conditions such as object contact and/or insertion. At this time, however, a waiting time is required to monitor the transition of the second derivative after the first derivative exceeds a predetermined load threshold. Accordingly, a certain length of idle time (waiting time) is required before the overload condition detection result is finally determined. There is thus a room for improvement in terms of quickly and accurately obtaining the overload condition diagnostic results.

To solve the above problem, the purpose of the present invention is to provide a power door device capable of quickly and accurately obtaining a result of diagnosing a door-related overload condition.

Solution to Problem

In order to achieve the above-mentioned purpose, the first aspect of the present invention provides a power door device including: a motor actuator configured to open/close a door of a host vehicle; a control unit configured to control driving of the motor actuator; an information acquisition unit configured to acquire information about each of vertical acceleration, namely acceleration of the host vehicle in a vertical direction, and a motor load for the motor actuator; and a diagnostic unit configured to make a first determination as to whether or not the motor load exceeds a predetermined load threshold and a second determination as to whether or not the vertical acceleration exceeds a predetermined acceleration threshold, and diagnose, based on results of the first and second determinations, whether or not an overload condition has occurred at the door, wherein the diagnostic unit generates an abnormal signal when the motor load exceeds the predetermined load threshold and the vertical acceleration does not exceed the acceleration threshold, and wherein the control unit includes an abnormal state control unit, which performs an abnormal state dealing control in response to the abnormal signal from the diagnostic unit during controlling the driving of the motor actuator.

Advantageous Effects of Invention

The present invention makes it possible to quickly and accurately obtain a result of diagnosing a door-related overload condition.

BRIEF DESCRIPTION OF DRAWINGS

FIG. 3G conceptually shows that the motor load current threshold is increased or decreased for correction in order to obtain the appropriate motor load current threshold for each attitude when the host vehicle's attitude is variably changed during door auto-opening or auto-closing.

DESCRIPTION OF EMBODIMENTS

Figure 1A:
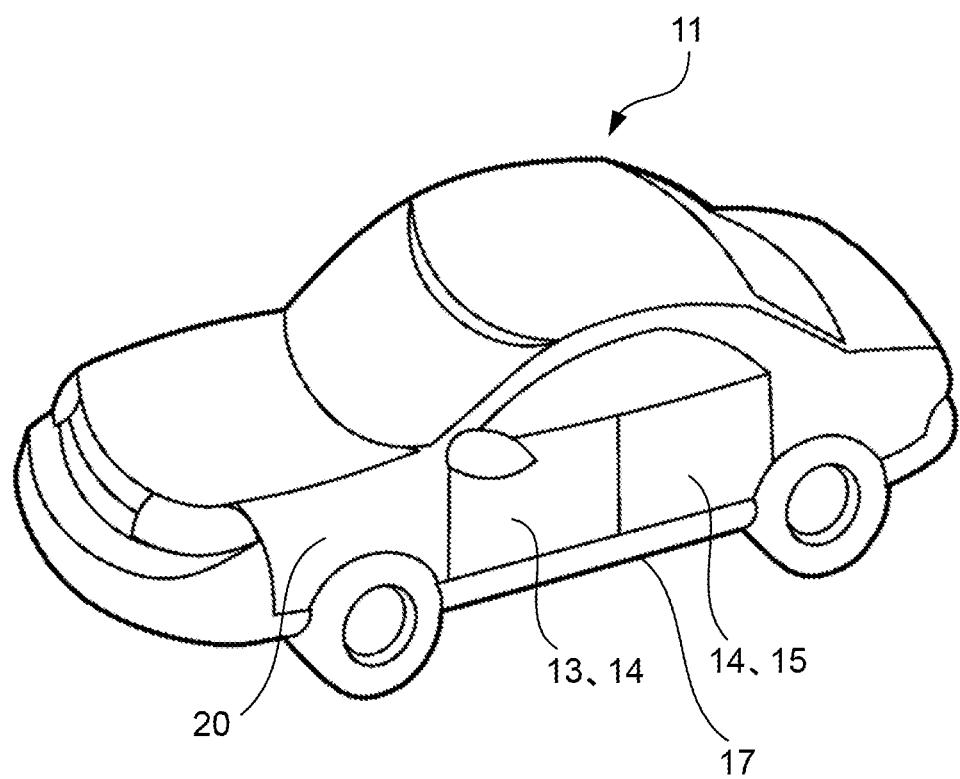
FIG. 1A is an exterior perspective view of a vehicle equipped with a power door device according to an embodiment of the present invention.

Hereinafter, a power door device according to an embodiment of the present invention will be described in detail by appropriately referring to the Drawings. Note that in the following figures, members that share a function have the same reference numerals. In addition, the size and shape of each member may be modified or schematically exaggerated for description convenience. Unless otherwise indicated, the description using a direction is based on front-rear, left-right, and up-down when viewed from a driver seated in the driver's seat (a front seat on the right side). In short, the "front-rear direction" corresponds to the "vehicle longitudinal direction", the "left-right direction" corresponds to the "vehicle width direction," and the "vertical direction" corresponds to the "vehicle height direction", respectively. Here, a vehicle 11 equipped with a power door device 10 according to an embodiment of the present invention will be described. Unless otherwise indicated, each of a plurality of members constituting the vehicle body of the vehicle 11 is formed using a metallic material such as a steel plate.

Figure 1B:
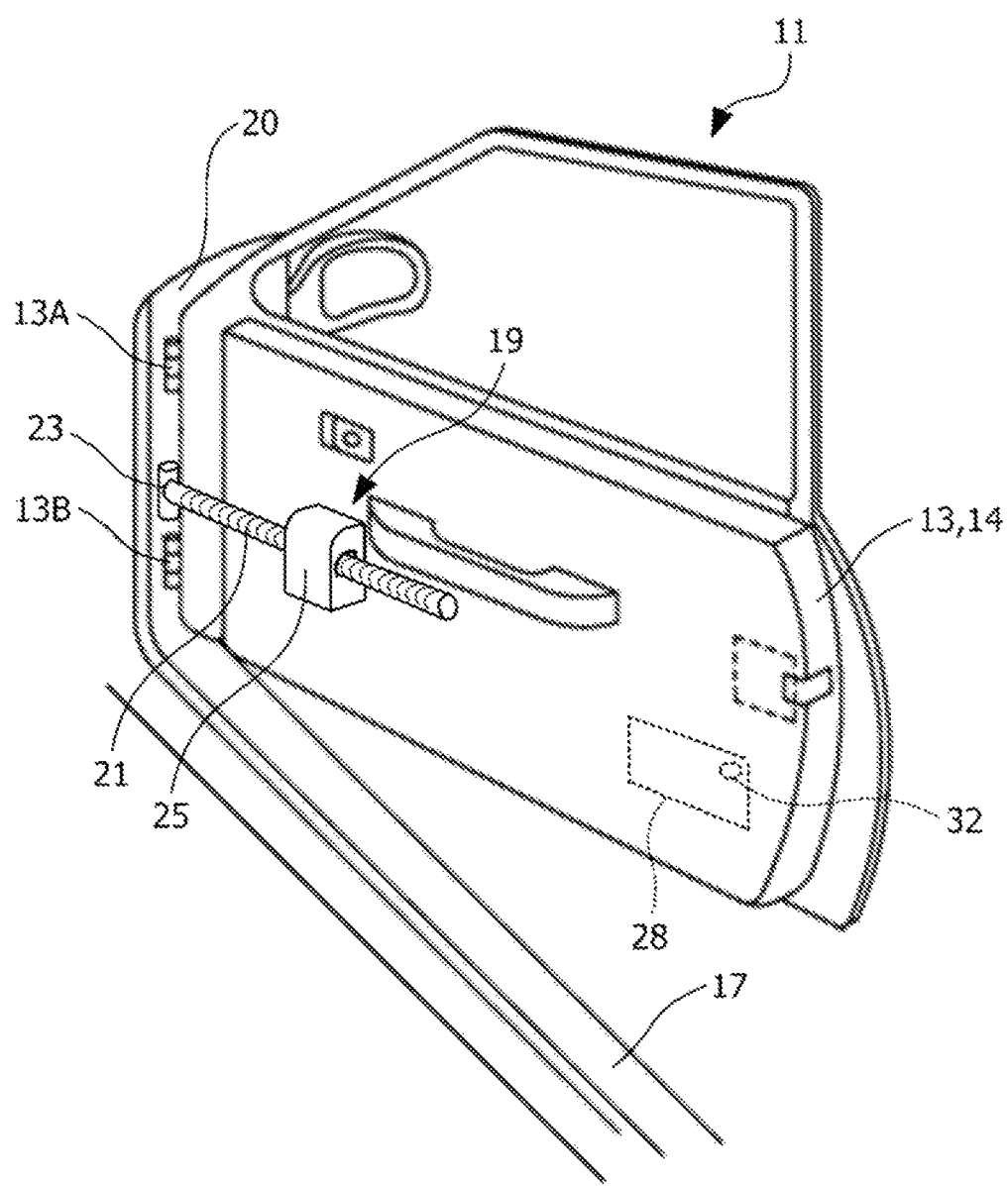
FIG. 1B is a perspective view illustrating how the power door device is installed to a door.

Configuration of Power Door Device 10 According to Embodiment of the Present Invention First, the configuration of a vehicle 11 equipped with a power door device 10 according to an embodiment of the present invention will be described, if appropriate, with reference to FIGS. 1A and 1B. FIG. 1A is an exterior perspective view of the vehicle 11 equipped with the power door device 10 according to this embodiment. FIG. 1B is a perspective view illustrating how the power door device 10 is installed to a door 13.

The vehicle 11 equipped with the power door device 10 according to this embodiment has left and right front doors 13, left and right rear doors 15, and left and right side sills 17 on its lateral sides, respectively, as shown in FIG. 1A. In the following description, when the identification of the front seat door 13 or the rear seat door 15 is not required, they are collectively referred to as a "door 14".

The front seat door 13 (door 14) is freely opened/closed so as to swing on a vehicle body 20 via a pair of hinge mechanisms 13A and 13B, which are aligned in the vehicle height direction, as shown in FIG. 1B. The door 14 is provided with a motor actuator 19 that drives the opening and closing of the door 14 in the power door device 10.

The motor actuator 19, as shown in FIG. 1B, has a spindle screw 21 with a threaded groove engraved on its outer circumference along the shaft direction and a spindle nut (not shown) with a threaded groove that is engraved on its inner circumference and is engaged with the former threaded groove. The motor actuator 19 is provided with a door motor 25 with a rotor (not shown) connected to the spindle nut via a deceleration mechanism (not shown).

One end of the spindle screw 21 is pivoted via a joint mechanism 23 provided at the vehicle body 20. The other end of the spindle screw 21 is provided with the door motor 25 mentioned above. The door motor 25 is fixed to the inner side of the front seat door 13 (door 14).

Configuration of Door ECU 28 and its Surroundings Included in Power Door Device 10

Next, the configuration of a door ECU 28 and its surroundings included in the power door device 10 according to this embodiment will be described, if appropriate, with reference to FIGS. 2 and 3C to 3G.

Figure 2:
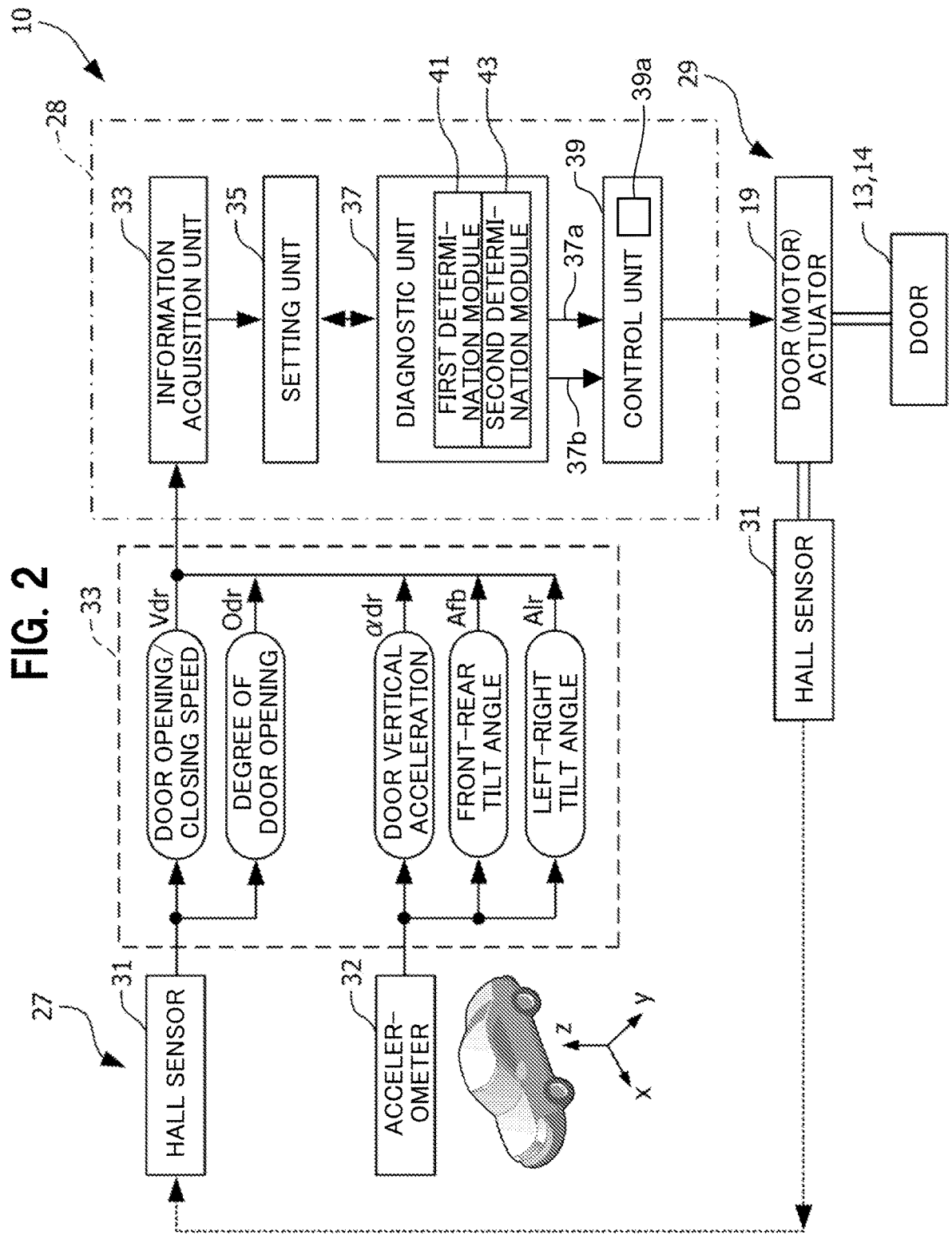
FIG. 2 is a functional block diagram of a power door device according to an embodiment of the present invention.
Figure 3A:
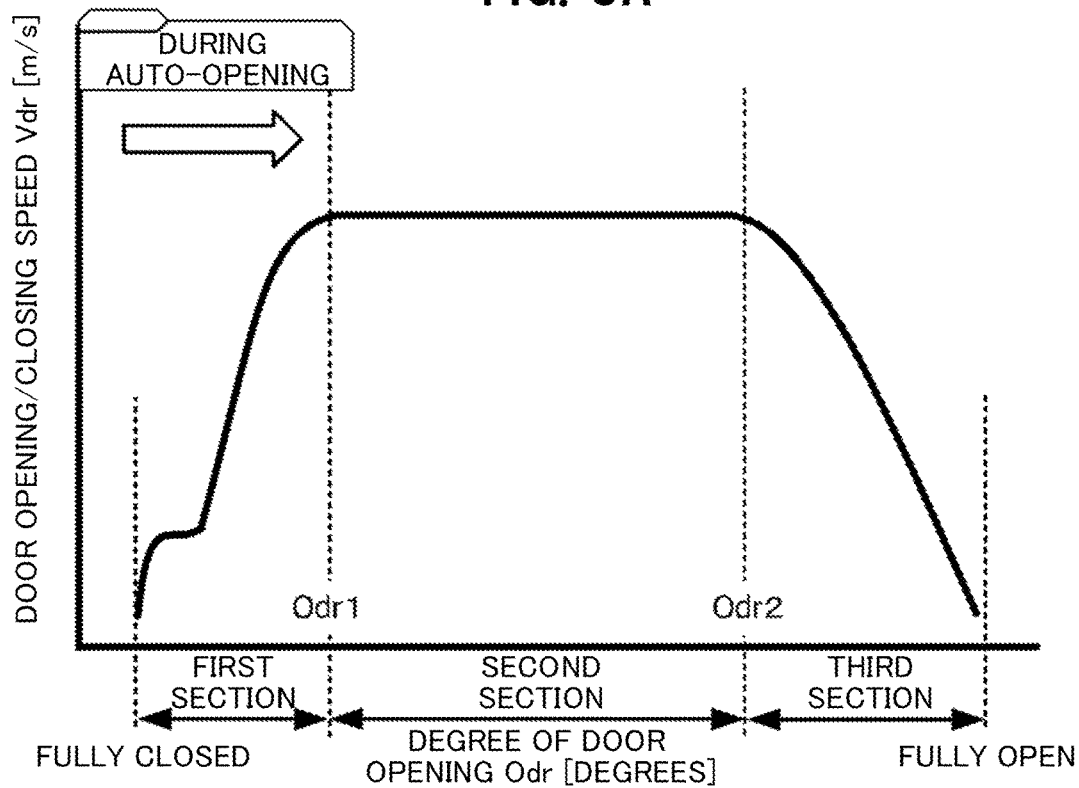
FIG. 3A conceptually represents information about how the door opening/closing speed corresponds to the degree of door opening during door auto-opening.
Figure 3B:
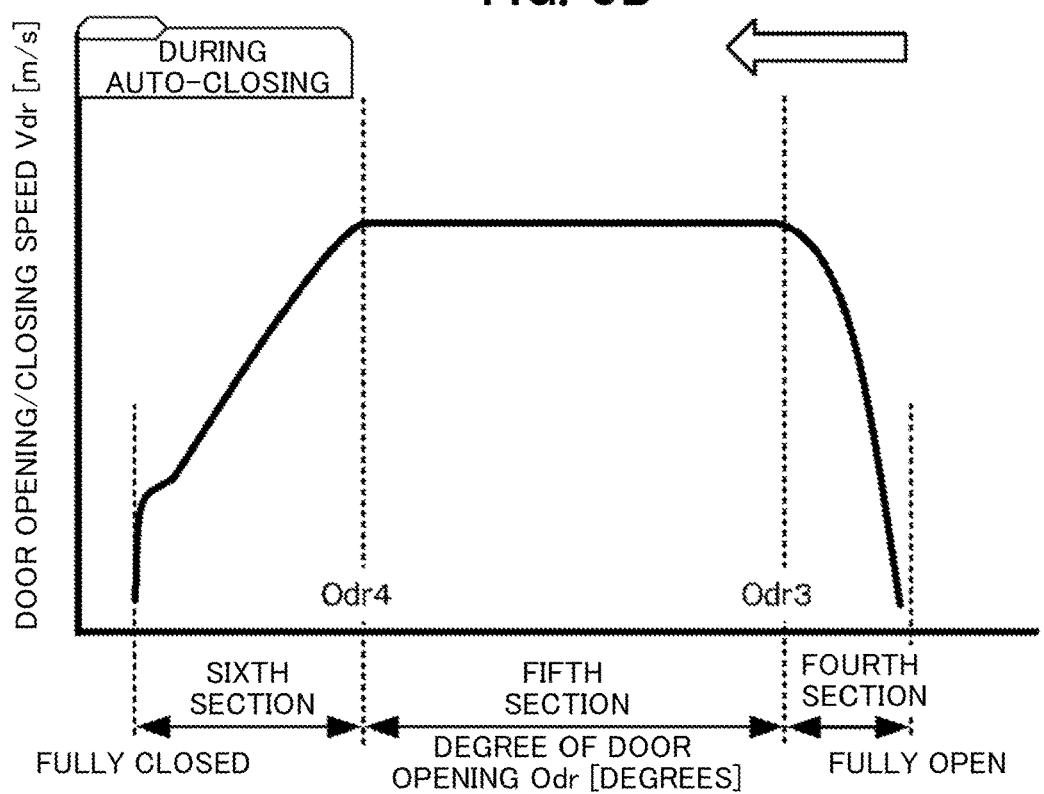
FIG. 3B conceptually represents information about how the door opening/closing speed corresponds to the degree of door opening during door auto-closing.
Figure 3C:
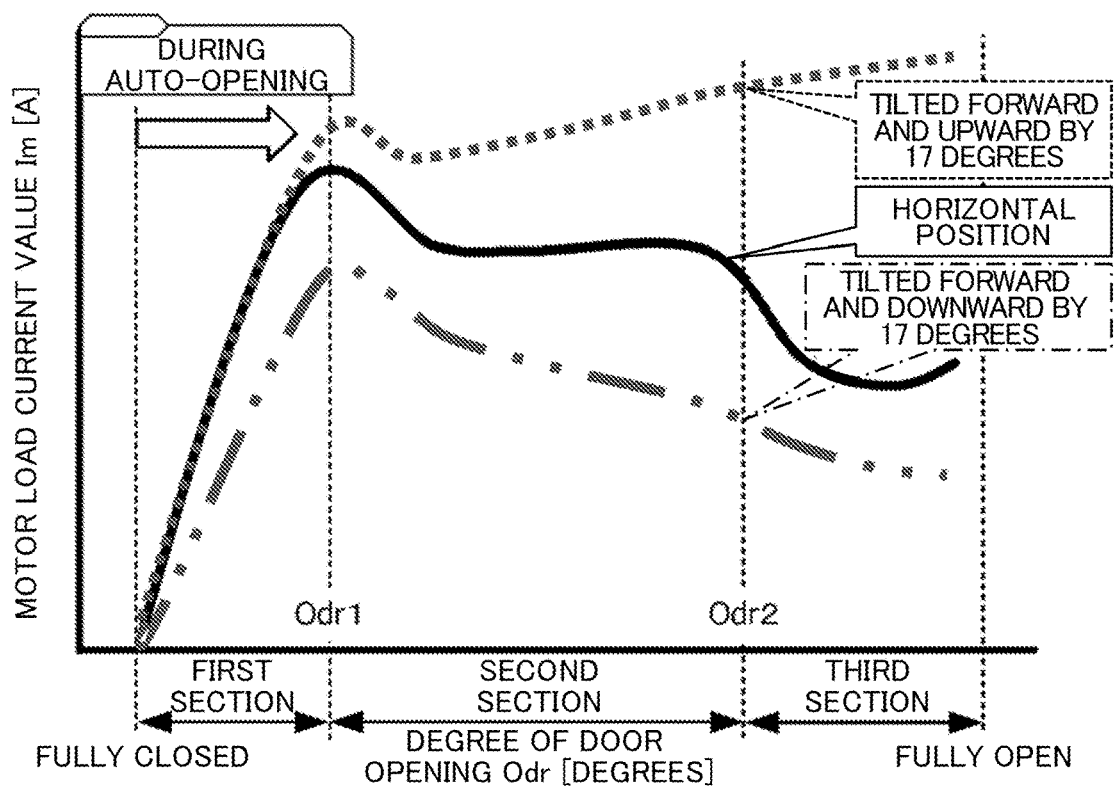
FIG. 3C compares and conceptually represents how the motor load current characteristics correspond to the degree of door opening when the host vehicle's attitude is changed from a horizontal to tilted position in the front-rear direction during door auto-opening.
Figure 3D:
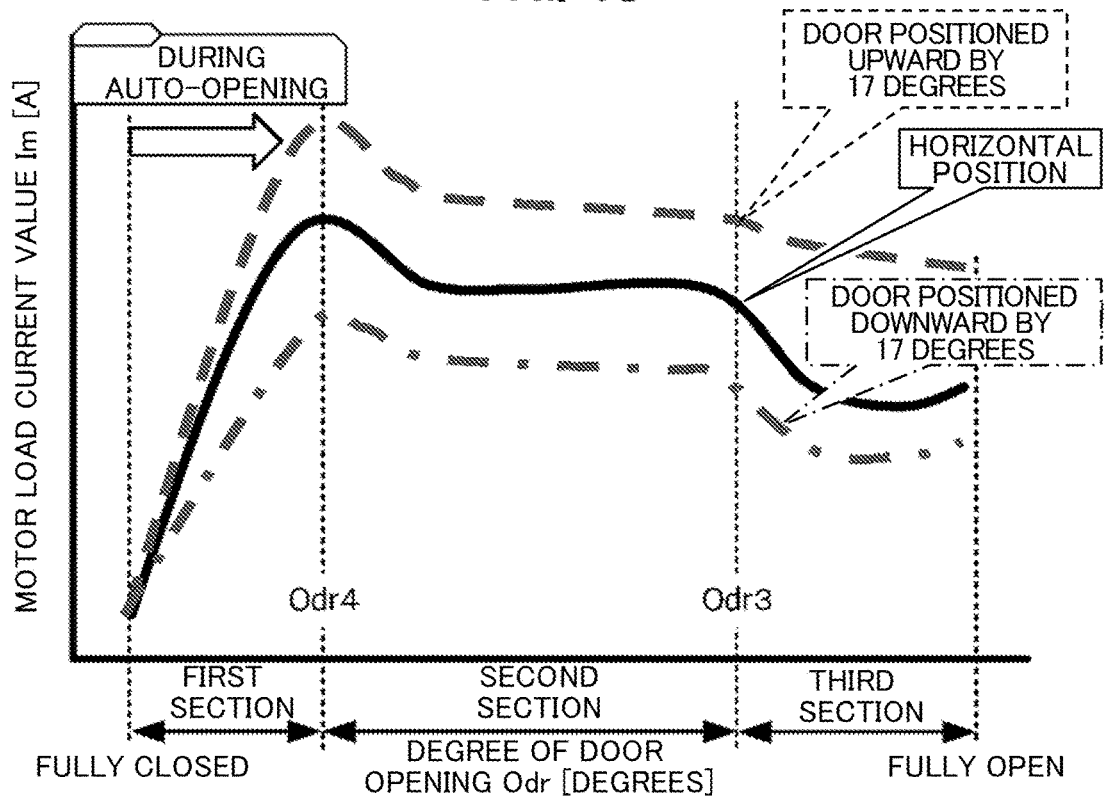
FIG. 3D compares and conceptually represents how the motor load current characteristics correspond to the degree of door opening when the host vehicle's attitude is changed from a horizontal to tilted position in the left-right direction during door auto-opening.
Figure 3E:
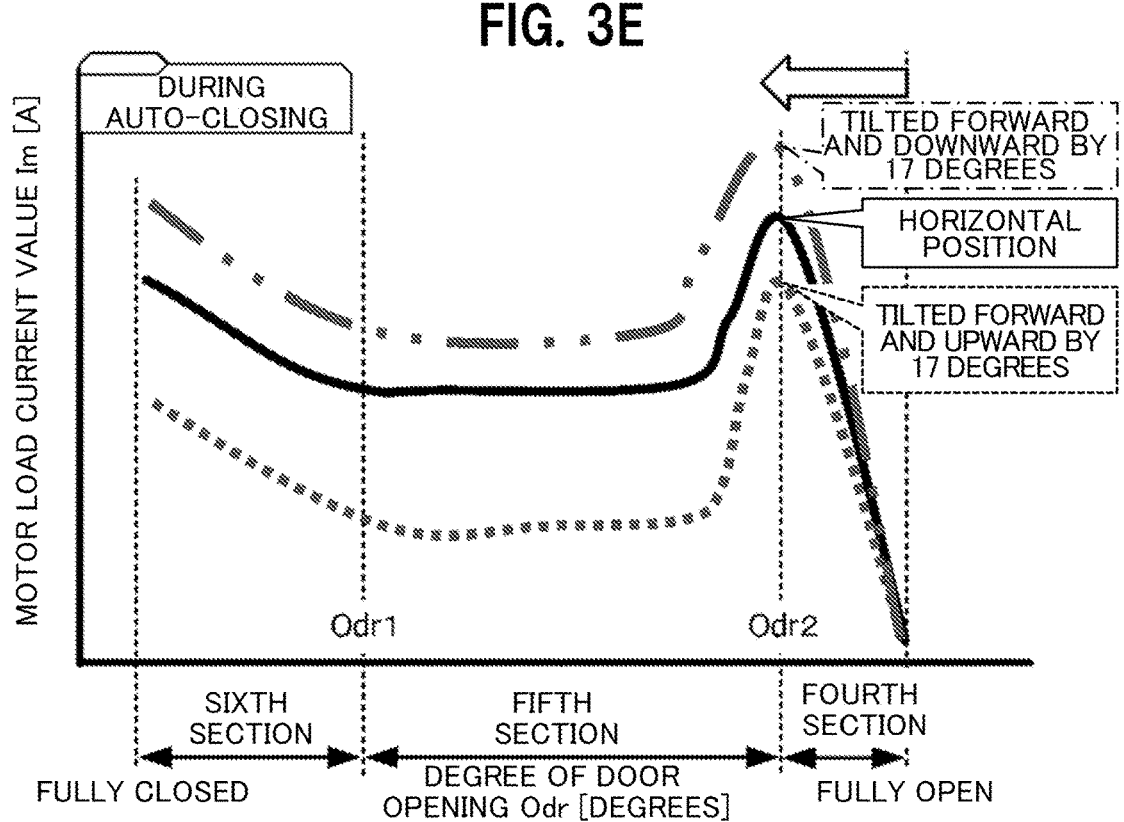
FIG. 3E compares and conceptually represents how the motor load current characteristics correspond to the degree of door opening when the host vehicle's attitude is changed from a horizontal to tilted position in the front-rear direction during door auto-closing.
Figure 3F:
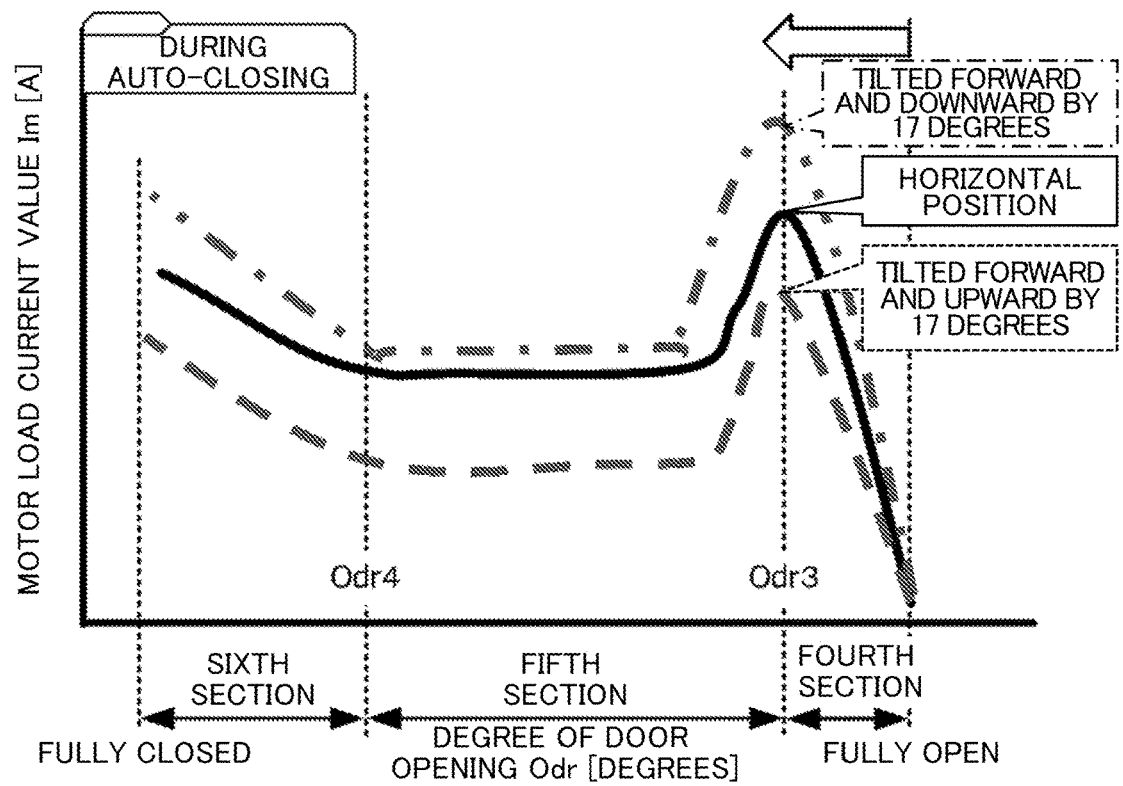
FIG. 3F compares and conceptually represents how the motor load current characteristics correspond to the degree of door opening when the host vehicle's attitude is changed from a horizontal to tilted position in the left-right direction during door auto-closing.

FIG. 2 is a functional block diagram of the power door device 10. FIG. 3A conceptually represents information about how the door opening/closing speed Vdr corresponds to the degree of door opening Odr during auto-opening of the door 14. FIG. 3B conceptually represents information about how the door opening/closing speed Vdr corresponds to the degree of door opening Odr during auto-closing of the door 14. FIGS. 3C and 3D compare and conceptually represent how the motor load current characteristics correspond to the degree of door opening Odr when the host vehicle 11's attitude is changed from a horizontal to tilted position in the front-rear direction/left-right direction during auto-opening of the door 14. FIGS. 3E and 3F compare and conceptually represent how the motor load current characteristics correspond to the degree of door opening Odr when the host vehicle 11's attitude is changed from a horizontal to tilted position in the front-rear direction/left-right direction during auto-closing of the door 14. FIG. 3G conceptually shows that the motor load current threshold Imth is increased or decreased for correction in order to obtain the appropriate motor load current threshold Imth for each attitude when the host vehicle 11's attitude is variably changed during auto-opening or auto-closing of the door 14.

The power door device 10 according to this embodiment will be described. For example, when an occupant who is authorized to enter the vehicle 11 and carries a key member (not shown) approaches the locked host vehicle 11, a predetermined authentication process is performed between the key member and the onboard system (not shown). If the authentication process is successful, the successful authentication triggers the door lock to be unlocked and the motor actuator 19 on the driver side door 14 starts to open the door 14.

Here, how to drive the opening of the door 14 by the motor actuator 19 is described (the details will be described later). In order to obtain a sequentially set target door opening/closing speed Vdrtg at the current degree of door opening Odr, the door ECU 28 (control unit 39), installed at the front seat door 13 (door 14) performs a drive control of the motor actuator 19, i.e., a speed tracking control to control, based on data from the information acquisition unit 33, the setting unit 35, and the diagnostic unit 37, the door opening/closing speed Vdr at the current degree of door opening Odr as a drive control signal 37a such that the door opening/closing speed Vdr becomes closer to the target door opening/closing speed Vdrtg.

By the way, when controlling the driving of the door 14 by using the motor actuator 19, it is essential to accurately diagnose the occurrence of an overload condition caused by interference (e.g., contact, insertion) between the door 14 and an object. The purpose is to protect the object from physical contact with the door 14 due to the interference and to beforehand prevent the motor actuator 19 from falling into an abnormal state such as burning out.

Here, in the power door device 10 according to this embodiment, as shown in FIG. 2, a diagnostic unit 37 belonging to the door ECU 28 makes a first determination as to whether or not a motor load current value Im exceeds a predetermined motor load current threshold Imth, and makes a second determination as to whether or not vertical acceleration αdr of the host vehicle 11 exceeds a predetermined acceleration threshold αdrth. The results of the first and second determinations are used to diagnose whether or not an overload condition has occurred at the door 14. In particular, when the motor load current value Im exceeds the motor load threshold Imth as a result of the first determination, an abnormality where an overload condition has occurred at the door 14 is diagnosed.

Figure 4A:
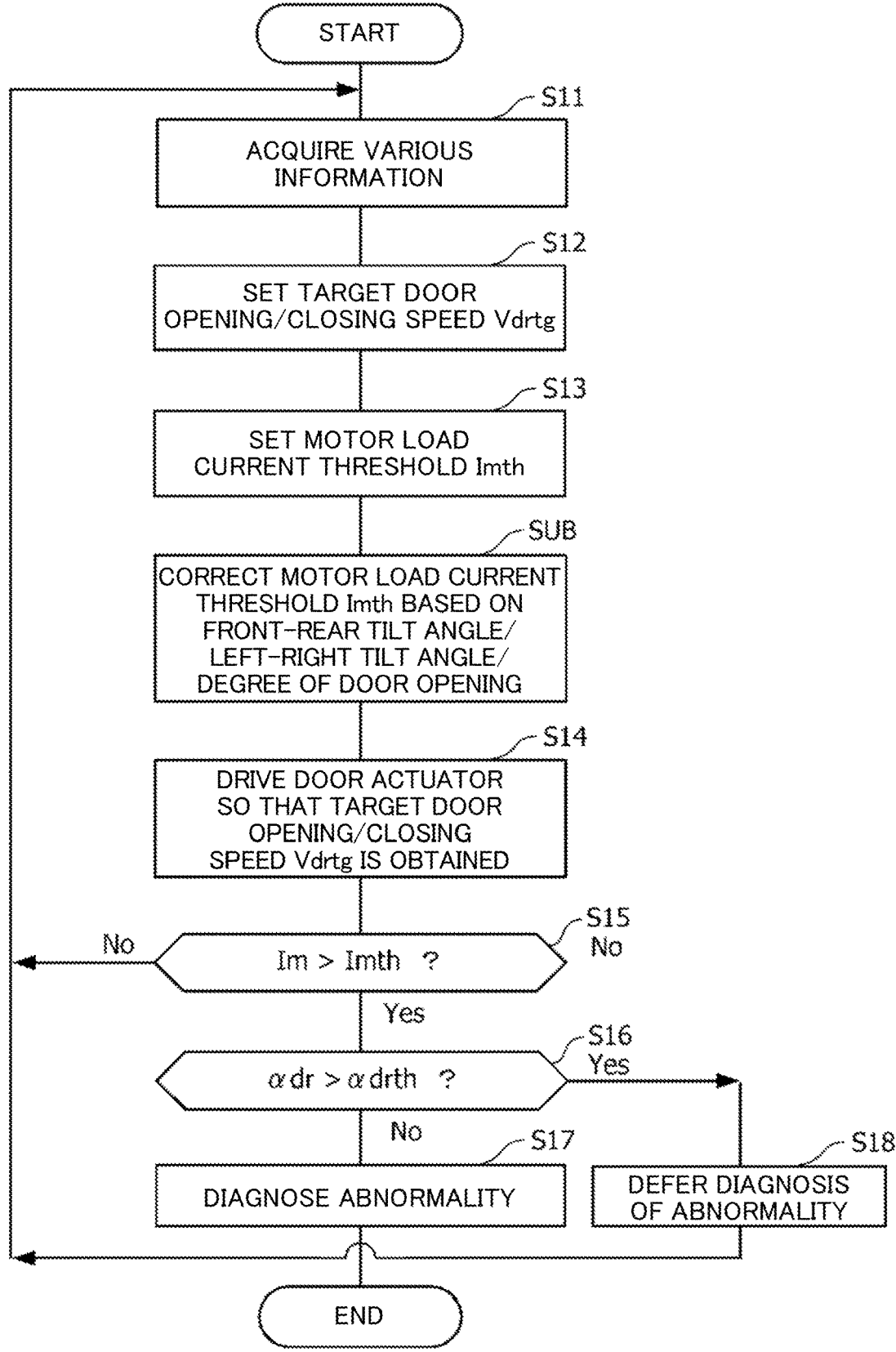
FIG. 4A is a flowchart illustrating how a power door device according to an embodiment of the present invention works.

On the other hand, when the vertical acceleration αdr of the host vehicle 11 exceeds the acceleration threshold αdrth as a result of the second determination, the above abnormality diagnosis is deferred (not made in the current second determination as shown in FIG. 4A, S16 and S18 and no output of an abnormal signal 37b and repeat the diagnosis). By doing so, the influence of external disturbance (change in the vertical acceleration αdr of the host vehicle 11) on the abnormality diagnosis results is suppressed, thereby improving the accuracy of the abnormality diagnosis.

When the vertical acceleration αdr of the host vehicle 11 does not exceed the predetermined acceleration threshold αdrth, an abnormal diagnosis is made and outputs the abnormal signal 37b to the control unit 39. The diagnosis is repeated during the auto-opening and the auto-closing In addition, the diagnostic unit 37 belonging to the ECU 28 corrects the motor load current threshold Imth based on information about the attitude of the host vehicle 11 due to tilting in the front-rear and left-right directions and information about the degree of door opening Odr. The motor load current threshold Imth after the correction is used to make the first determination. This can also suppress the influence of external disturbance (change in the attitude of the host vehicle 11 due to tilting in the front-rear and left-right directions and change in the degree of door opening Odr) on the abnormality diagnosis results, thereby improving the accuracy of the abnormality diagnosis.

To realize the above various functions, the power door device 10 according to this embodiment is configured to include functional sections belonging to an input system 27, an information processing system (door ECU) 28, or an output system 29 respectively, as shown in FIG. 2.

The functional section belonging to the input system 27 includes a Hall sensor 31 and an accelerometer 32.

The Hall sensor 31 outputs a detection signal containing time-series information about the rotational position and rotational speed of a rotor for a door motor 25 belonging to the motor actuator 19. The Hall sensor 31 functions to detect the "degree of door opening Odr" in the present invention.

The output signals of the Hall sensor 31 are sequentially sent to an information acquisition unit 33 belonging to the door ECU 28.

While the front-rear direction of the horizontally stationary vehicle 11 is set to x-axis direction, the left-right direction (vehicle width direction) is set to y-axis direction, and the vertical direction (vehicle height direction) is set to z-axis direction, the accelerometer 32 outputs a detection signal corresponding to the roll angle, which is the angle of rotation about the x-axis, a detection signal corresponding to the pitch angle, which is the angle of rotation about the y-axis, and a detection signal corresponding to the yaw angle, which is the angle of rotation about the z-axis, respectively.

The accelerometer 32 is mounted on a board (not shown) of the door ECU 28, as shown in FIG. 1B.

The output signals (roll angle/pitch angle/yaw angle) of the accelerometer 32 are sequentially sent to the information acquisition unit 33 belonging to the door ECU 28.

The functional section that is an information processing system and belongs to the door ECU 28 includes the information acquisition unit 33, the diagnostic unit 37, a setting unit 35, and a control unit 39.

The information acquisition unit 33 converts the output signals sent from the Hall sensor 31 into time-series information involving each of the door opening/closing speed Vdr and the degree of door opening Odr.

In addition, the information acquisition unit 33 converts the output signals (roll angle/pitch angle/yaw angle) sent from the accelerometer 32 into time series information involving each of the front-rear tilt angle Afb or the left-right tilt angle Alr.

Further, the information acquisition unit 33 converts the output signals (roll angle/pitch angle/yaw angle) sent from the accelerometer 32 into time series information involving the vertical acceleration αdr of the host vehicle 11.

Furthermore, the information acquisition unit 33 also acquires information about the opening/closing direction of the door 14. The information about the opening/closing direction of the door 14 may be acquired by the positive/negative sign of the difference in the degree of door opening Odr at a certain time interval among the time series information about the degree of door opening Odr.

In short, the information acquisition unit 33 acquires time-series information involving the door opening/closing speed Vdr and the degree of door opening Odr based on the output signals sent from the Hall sensor 31, time-series information involving the vertical acceleration αdr of the host vehicle 11, and time-series information involving the front-rear tilt angle Afb and the left-right tilt angle Alr based on the output signals from the accelerometer 32.

For example, the degree of door opening Odr is defined by assigning 0 to the fully closed state and 100 to the fully opened (opened to the limit) state. By assigning an appropriate numerical value from 1 to 99 to the current open/closed state, the current position of door 14 in the relative coordinate system can be expressed.

The vertical acceleration αdr of the host vehicle 11 is acceleration acting on the host vehicle 11 in the up-down direction (vehicle height direction: z-axis direction). In the power door device 10 according to this embodiment, the door 14 is provided with the accelerometer 32. The output signals of the accelerometer 32 are used to acquire information about the tilt attitude (tilt angle) of the host vehicle 11 in the front-rear or left-right direction, and the vertical acceleration αdr of the host vehicle 11.

The front-rear tilt angle Afb, for example, can express the attitude (tilt angle) of the host vehicle 11 in the front-rear direction in a relative coordinate system by assigning a numerical value of 0 to the horizontal state, a positive value to the forward tilt state, and a negative value to the rearward tilt state, respectively.

Similarly, the left-right tilt angle Alr, for example, can express the attitude (tilt angle) of the host vehicle 11 in the left-right direction in a relative coordinate system by assigning a numerical value of 0 to the horizontal state, a positive value to the leftward tilt state, and a negative value to the rightward tilt state, respectively.

The time-series information about the door opening/closing speed Vdr and the degree of door opening Odr, the time-series information about the vertical acceleration αdr of the host vehicle 11, and the time-series information about the front-rear tilt angle Afb and the left-right tilt angle Alr obtained by the information acquisition unit 33 are each sent to the setting unit 35.

The setting unit 35 belonging to the door ECU 28 uses the information (see FIGS. 3A and 3B) about how the degree of door opening Odr corresponds to the door opening/closing speed Vdr to extract the door opening/closing speed (value) Vdr corresponding to the current degree of door opening. The extracted door opening/closing speed Vdr is set as a target door opening/closing speed Vdrtg.

Here, the procedure for setting the target door opening/closing speed Vdrtg is explained with reference to FIGS. 3A and 3B as appropriate, separately for the case of auto-opening or auto-closing of the door 14.

The period during auto-opening of the door 14 means as follows: for example, an occupant with an ignition key for the host vehicle gives a door 14 opening instruction; at this time, this opening instruction is used as a trigger to set the period from the trigger until the motor actuator 19 provided at the door 14 is driven such that the fully closed door 14 becomes a fully open state.

FIG. 3A represents information about how the door opening/closing speed Vdr corresponds to the degree of door opening Odr during auto-opening of the door 14.

In the relational information shown in FIG. 3A, the abscissa, which represents the degree of door opening Odr, is segmented into the first section for opening the door 14 from the fully closed state to the first degree of door opening Odr1; the second section for opening the door 14 from the first degree of door opening Odr1 to the second degree of door opening Odr2; and the third section for opening the door 14 from the second degree of door opening Odr2 to the fully open state.

In the first section, the information about how the degree of door opening Odr corresponds to the door opening/closing speed Vdr is characteristic of almost ascending to the right. In the second section, the information about how the degree of door opening Odr corresponds to the door opening/closing speed Vdr shows a flat characteristic. In the third section, the information about how the degree of door opening Odr corresponds to the door opening/closing speed Vdr is characteristic of almost descending to the right.

On the other hand, the period during auto-closing of door 14 means as follows: for example, an occupant, who is seated in the cabin of the host vehicle, operates a door closing switch (not shown) to give a door 14 closing instruction; at this time, this closing instruction is used as a trigger to set the period from the trigger until the motor actuator 19 provided at the door 14 is driven such that the fully open door 14 becomes a fully closed state.

FIG. 3B represents information about how the door opening/closing speed Vdr corresponds to the degree of door opening Odr during auto-closing of the door 14.

In the relational information shown in FIG. 3B, the abscissa, which represents the degree of door opening Odr, is segmented into the fourth section for closing the door 14 from the fully open state to the third degree of door opening Odr3; the fifth section for closing the door 14 from the third degree of door opening Odr3 to the fourth degree of door opening Odr4; and the sixth section for closing the door 14 from the fourth degree of door opening Odr4 to the fully closed state.

In the fourth section, the information about how the degree of door opening Odr corresponds to the door opening/closing speed Vdr is characteristic of steeply ascending to the left. In the fifth section, the information about how the degree of door opening Odr corresponds to the door opening/closing speed Vdr shows a flat characteristic. In the sixth section, the information about how the degree of door opening Odr corresponds to the door opening/closing speed Vdr is characteristic of gradually descending to the left.

The power door device 10 according to this embodiment may be used during auto-opening or auto-closing of the door 14. At this time, the setting unit 35 belonging to the door ECU 28 uses the information (see FIG. 3A) about how the degree of door opening Odr corresponds to the door opening/closing speed Vdr to extract the door opening/closing speed Vdr corresponding to the current degree of door opening Odr. The extracted door opening/closing speed Vdr is set as a target door opening/closing speed Vdrtg.

In the drive control for the motor actuator 19, the target door opening/closing speed Vdrtg, which is set sequentially in response to a change in the degree of door opening Odr, is obtained. In other words, a speed tracking control is executed so that the door opening/closing speed Vdr at the current degree of door opening Odr becomes closer to the target door opening/closing speed Vdrtg.

During auto-opening, the setting unit 35 belonging to the door ECU 28 multiplies, by a predetermined coefficient X (provided that the coefficient X>1), the value according to the characteristic diagram of the relationship between the degree of door opening Odr and the motor load current value Im (see FIGS. 3C and 3D) of the host vehicle 11 in the horizontal position. The resulting multiplied value is set as the motor load current threshold Imth.

In practice, if raw data about the motor load current value Im is used as it is for the first determination, the problem is that noise immunity becomes a weak point. Therefore, the time-series data involving motor load currents may be sampled at a timely interval and averaged. This average value may be used as the motor load current value Im for the first determination. Alternatively, a time derivative may be calculated for the time-series data involving motor load currents.

This calculated value may be used as the motor load current value Im for the first determination. Any of the various motor load current values Im, at which such operations are performed, corresponds to the "motor load" in the technical matter "first determination as to whether or not the motor load exceeds the predetermined load threshold" in the present invention.

During auto-closing, the setting unit 35 belonging to the door ECU 28 multiplies, by a predetermined coefficient Y (provided that the coefficient Y>1), the value according to the characteristic diagram of the relationship between the degree of door opening Odr and the motor load current value Im (see FIGS. 3E and 3F) of the host vehicle 11 in the horizontal position. The resulting multiplied value is set as the motor load current threshold Imth.

The target door opening/closing speed Vdrtg and the motor load current threshold Imth set by the setting unit 35 belonging to the door ECU 28 (corresponding to the degree of door opening Odr) are each sent to the diagnostic unit 37 and the control unit 39.

The diagnostic unit 37 belonging to the door ECU 28 includes: a first determination module 41 configured to make a first determination as to whether or not the motor load current value Im exceeds a predetermined motor load current threshold Imth; and a second determination module 43 configured to make a second determination as to whether or not the vertical acceleration αdr of the host vehicle 11 exceeds a predetermined acceleration threshold αdrth, wherein the results of the first and second determinations are used to diagnose whether or not an overload condition has occurred at the door 14.

As the motor load current threshold Imth, an appropriate value is set in consideration of the required accuracy for abnormality diagnosis, the design tolerance of the motor load current for the motor actuator 19, and other factors.

As the acceleration threshold αdrth, an appropriate value is set in consideration of a certain level of acceleration that can be regarded as an external disturbance.

In particular, when the motor load current value Im exceeds the motor load current threshold Imth as a result of the first determination, the diagnostic unit 37 diagnoses an abnormality where an overload condition has occurred at the door 14. On the other hand, when the vertical acceleration αdr of the host vehicle 11 exceeds the acceleration threshold αdrth as a result of the second determination, the above abnormality diagnosis is deferred (the abnormal diagnoses is not made and no abnormal signal 37b is made) and repeats the diagnosis).

By doing so, the influence of external disturbance (change in the vertical acceleration αdr of the host vehicle 11) on the abnormality diagnosis results is suppressed, thereby improving the accuracy of the abnormality diagnosis.

In addition, the diagnostic unit 37 corrects the motor load current threshold Imth based on information about the attitude of the host vehicle 11 due to tilting in the front-rear and left-right directions and information about the degree of door opening Odr. The motor load current threshold Imth after the correction is used to make the first determination.

This can suppress the influence of external disturbance (change in the attitude of the host vehicle 11 due to tilting in the front-rear and left-right directions and change in the degree of door opening Odr) on the abnormality diagnosis results, thereby improving the accuracy of the abnormality diagnosis.

The results involving the first and second determinations by the diagnostic unit 37 are sent to the control unit 39 as the abnormal signal 37a. More specifically, the diagnostic unit 17 generates the abnormal signal 37a when the motor load exceeds a predetermined load threshold and the vertical acceleration does not exceed the acceleration threshold as a result of the second determination, the abnormal is generated. When the motor load exceeds the predetermined load threshold and the vertical acceleration exceeds the acceleration threshold, the abnormal is not generated.

The control unit 39 further includes an abnormal state control unit 39a, which performs an abnormal state dealing control in response to the abnormal signal 37b from the diagnostic unit 37 during controlling the driving of the motor actuator (door opening and closing. The abnormal state dealing control includes: emitting an alarm sound by a buzzer or the like (not shown); stopping the door opening or closing; and inversing the direction of the door closing or opening. The an abnormal state control unit 39a performs one of the abnormal state dealing controls in accordance with a setting in the setting unit 35, and can performs a combination of the abnormal state dealing controls, or sequentially performing each of the abnormal state controls. When there is no abnormal signal 37b, the speed tracking control is made, as described above. [0052] The following overviews how the diagnostic unit 37 corrects the motor load current threshold Imth based on information about the attitude of the host vehicle 11 due to tilting in the front-rear and left-right directions and information about the degree of door opening Odr.

Specifically, the diagnostic unit 37 belonging to the door ECU 28 corrects (increases/decreases) the motor load current threshold Imth based on information about the attitude of the host vehicle 11 due to tilting in the front-rear and left-right directions during auto-opening of the door 14.

During auto-opening of the door 14, the vehicle 11 may be located on a slope in the front-rear or left-right direction. This case may cause a change in the self-weight by the opening of the door 14 when compared to the case where the vehicle 11 is located on a flat ground. Here, the driving of the motor actuator 19 may be controlled to obtain the target door opening/closing speed Vdrtg, which is set sequentially. In this case, the motor load current value Im for the motor actuator 19 also changes in response to the change in the self-weight as caused by the opening of the door 14.

Specifically, as shown in FIGS. 3C, 3D, and 3G, for example, during auto-opening of the door 14, a force may act on the door 14 to prevent it from being opened due to a change in the attitude of the host vehicle 11. In this case (tilted forward and upward by 17 degrees/door positioned upward by 17 degrees), the motor load current threshold Imth is increased and corrected when compared to the case where the host vehicle 11 is in the horizontal position.

In the above case where the force that prevents the door 14 from being opened acts on the door 14, the motor load current value Im tends to increase when compared to the case where the vehicle 11 is in the horizontal position. Therefore, it is preferable to increase and correct the motor load current threshold Imth according to such actual conditions.

This can suppress the influence of external disturbance (change in the attitude of the host vehicle 11 due to tilting in the front-rear and left-right directions) on the abnormality diagnosis results during auto-opening of the door 14, thereby improving the accuracy of the abnormality diagnosis.

Note that the wording "tilted forward and upward by 17 degrees" means that a target is each door of the host vehicle 11 located and tilted forward and upward on a slope in the vehicle longitudinal direction (at a tilt angle of 17 degrees).

In addition, "door positioned upward by 17 degrees" means that a target is each door positioned on the upper side of the host vehicle 11 located on a slope in the vehicle width direction (at a tilt angle of 17 degrees).

In contrast, as shown in FIGS. 3C, 3D, and 3G, for example, during auto-opening of the door 14, a force may act on the door 14 to promote it to be opened due to a change in the attitude of the host vehicle 11. In this case (tilted forward and downward by 17 degrees/door positioned downward by 17 degrees), the motor load current threshold Imth is decreased and corrected when compared to the case where the host vehicle 11 is in the horizontal position.

In the above case where the force that promotes the door 14 to be opened acts on the door 14, the motor load current value Im tends to decrease when compared to the case where the vehicle 11 is in the horizontal position. Therefore, it is preferable to decrease and correct the motor load current threshold Imth according to such actual conditions. This can suppress the influence of external disturbance (change in the attitude of the host vehicle 11 due to tilting in the front-rear and left-right directions) on the abnormality diagnosis results during auto-opening of the door 14, thereby improving the accuracy of the abnormality diagnosis.

Note that the wording "tilted forward and downward by 17 degrees" means that a target is each door of the host vehicle 11 located and tilted forward and downward on a slope in the vehicle longitudinal direction (at a tilt angle of 17 degrees).

In addition, "door positioned downward by 17 degrees" means that a target is each door positioned on the lower side of the host vehicle 11 located on a slope in the vehicle width direction (at a tilt angle of 17 degrees).

Meanwhile, the diagnostic unit 37 belonging to the door ECU 28 corrects (increases/decreases) the motor load current threshold Imth based on information about the attitude of the host vehicle 11 due to tilting in the front-rear and left-right directions during auto-closing of the door 14 like in the case of auto-opening of the door 14.

During auto-closing of the door 14, the vehicle 11 may be located on a slope in the front-rear or left-right direction. This case may cause a change in the self-weight by the closing of the door 14 when compared to the case where the vehicle 11 is located on a flat ground. Here, the driving of the motor actuator 19 may be controlled to obtain the target door opening/closing speed Vdrtg, which is set sequentially. In this case, the motor load current value Im for the motor actuator 19 also changes in response to the change in the self-weight as caused by the closing of the door 14.

Specifically, as shown in FIGS. 3E, 3F, and 3G, for example, during auto-closing of the door 14, a force may act on the door 14 to promote it to be closed due to a change in the attitude of the host vehicle 11. In this case (tilted forward and upward by 17 degrees/door positioned upward by 17 degrees), the motor load current threshold Imth is decreased and corrected when compared to the case where the host vehicle 11 is in the horizontal position. In the above case where the force that promotes the door 14 to be closed acts on the door 14, the motor load current value Im tends to decrease when compared to the case where the vehicle 11 is in the horizontal position. Therefore, it is preferable to decrease and correct the motor load current threshold Imth according to such actual conditions.

This can suppress the influence of external disturbance (change in the attitude of the host vehicle 11 due to tilting in the front-rear and left-right directions) on the abnormality diagnosis results during auto-closing of the door 14, thereby improving the accuracy of the abnormality diagnosis.

In contrast, as shown in FIGS. 3E, 3F, and 3G, for example, during auto-closing of the door 14, a force may act on the door 14 to prevent it from being closed due to a change in the attitude of the host vehicle 11. In this case (tilted forward and downward by 17 degrees/door positioned downward by 17 degrees), the motor load current threshold Imth is increased and corrected when compared to the case where the host vehicle 11 is in the horizontal position. In the above case where the force that prevents the door 14 from being closed acts on the door 14, the motor load current value Im tends to increase when compared to the case where the vehicle 11 is in the horizontal position. Therefore, it is preferable to increase and correct the motor load current threshold Imth according to such actual conditions.

This can suppress the influence of external disturbance (change in the attitude of the host vehicle 11 due to tilting in the front-rear and left-right directions) on the abnormality diagnosis results during auto-closing of the door 14, thereby improving the accuracy of the abnormality diagnosis.

The motor load current threshold Imth may be corrected (increased or decreased) due to a change in the attitude of the host vehicle 11. At this time, the correction amount for the front-rear tilt angle Afb and the correction amount for the left-right tilt angle Alr are calculated independently. These correction amounts may be added to give an integrated correction amount. The motor load current threshold Imth may be corrected (increased or decreased) using the integrated correction amount.

In addition, the motor load current threshold Imth may be corrected (increased or decreased). At this time, provided in advance is, for example, a table of standard relationship information about a standard change in the motor load current value Im in response to a change in the degree of door opening Odr when the host vehicle 11 is located on a flat ground. The standard motor load current value Im may be multiplied by a value (1.5) at the time of increase correction, by a value (1.3) at the time of no correction, and by a value (1.1) at the time of decrease correction. In this way, the motor load current threshold Imth may be corrected (increased or decreased).

Provided that the above values (1.5), (1.3), and (1.1) are merely examples. Therefore, the present invention can be implemented in various forms without being restricted to each of the above-mentioned example values, as long as they do not depart from the technical scope of the present invention.

In the correction to increase or decrease the motor load current threshold Imth, the standard motor load current threshold Im is used as a reference. The case where the value is corrected to be larger than the reference is called increase correction. In contrast, the case where the value is corrected to be smaller than the reference is called decrease correction.

By the way, the host vehicle 11 may have a change in the attitude due to tilting in the front-rear and left-right directions. In this case, the magnitude of the gravitational force acting on the door 14 also changes in response to the magnitude of the degree of door opening Odr. Specifically, the host vehicle 11 may have a change in the attitude and may be tilted with reference to the horizontal position. In this case, there is a close relationship between the degree of door opening Odr and the motor load current value Im for the motor actuator 19 at that time (the same applies to the motor load current threshold Imth).

Then, the diagnostic unit 37 belonging to the door ECU 28 corrects (increases/decreases) the motor load current threshold Imth based on information about the attitude of the host vehicle 11 due to tilting in the front-rear and left-right directions and the degree of door opening Odr.

In detail, as shown in FIGS. 3C, 3D, and 3G, for example, during auto-opening of the door 14, a force may act on the door 14 to prevent it from being opened due to a change in the attitude of the host vehicle 11. In this case (tilted forward and upward by 17 degrees/door positioned upward by 17 degrees), the motor load current threshold Imth is increased and corrected when compared to the case where the host vehicle 11 is in the horizontal position.

Such a correction is made by increasing the amount of correction for the motor load current threshold Imth at a certain degree of door opening Odr when compared to the case where the host vehicle 11 is in the horizontal position.

Specifically, the amount of correction for the motor load current threshold Imth at a certain degree of door opening Odr may be expressed by [(front-rear tilt angle Afb×tilt coefficient$\beta$)×current degree of door opening Odr]. The correction amount is larger as the front-rear tilt angle Afb becomes larger and/or the current degree of door opening Odr becomes larger. Here, (front-back tilt angle Afb×tilt coefficient $\beta$) means the output (duty ratio) required at the start of operating the door 14 (the same applies to the following).

In contrast, during auto-opening of the door 14, a force may act on the door 14 to promote it to be opened due to a change in the attitude of the host vehicle 11. In this case (tilted forward and downward by 17 degrees/door positioned downward by 17 degrees), the motor load current threshold Imth is decreased and corrected when compared to the case where the host vehicle 11 is in the horizontal position.

Such a correction is made by decreasing the amount of correction for the motor load current threshold Imth at a certain degree of door opening Odr when compared to the case where the host vehicle 11 is in the horizontal position.

Specifically, the amount of correction for the motor load current threshold Imth at a certain degree of door opening Odr may be expressed by [(front-rear tilt angle Afb×tilt coefficient $\beta$)×(degree of door opening Odr when fully opened−current degree of door opening Odr]. The correction amount is larger as the front-rear tilt angle Afb becomes larger. On the other hand, the correction amount is smaller as the current degree of door opening Odr becomes larger.

In contrast, as shown in FIGS. 3E, 3F, and 3G, for example, during auto-closing of the door 14, a force may act on the door 14 to prevent it from being closed due to a change in the attitude of the host vehicle 11. In this case (tilted forward and downward by 17 degrees/door positioned downward by 17 degrees), the motor load current threshold Imth is increased and corrected when compared to the case where the host vehicle 11 is in the horizontal position.

Such a correction is made by increasing the amount of correction for the motor load current threshold Imth at a certain degree of door opening Odr when compared to the case where the host vehicle 11 is in the horizontal position.

Specifically, the amount of correction for the motor load current threshold Imth at a certain degree of door opening Odr may be expressed by [(front-rear tilt angle Afb×tilt coefficient β)×current degree of door opening Odr]. The correction amount is larger as the front-rear tilt angle Afb becomes larger and/or the current degree of door opening Odr becomes larger.

In contrast, during auto-closing of the door 14, a force may act on the door 14 to promote it to be closed due to a change in the attitude of the host vehicle 11. In this case (tilted forward and upward by 17 degrees/door positioned upward by 17 degrees), the motor load current threshold Imth is decreased and corrected when compared to the case where the host vehicle 11 is in the horizontal position.

Such a correction is made by decreasing the amount of correction for the motor load current threshold Imth at a certain degree of door opening Odr when compared to the case where the host vehicle 11 is in the horizontal position.

Specifically, the amount of correction for the motor load current threshold Imth at a certain degree of door opening Odr may be expressed by [(front-rear tilt angle Afb×tilt coefficient β)×(degree of door opening Odr when fully opened−current degree of door opening Odr]. The correction amount is larger as the front-rear tilt angle Afb becomes larger. On the other hand, the correction amount is smaller as the current degree of door opening Odr becomes larger.

This configuration suppresses the influence of external disturbance (i.e., a change in the attitude of the host vehicle 11 due to tilting in the front-rear and left-right directions and a change in the degree of door opening Odr) on the abnormality diagnosis results when the host vehicle 11 has a change in the attitude and the door 14 is neither fully closed nor fully opened. This can contribute to improving the accuracy of abnormality diagnosis.

In the diagnostic unit 37, the motor load current threshold Imth is corrected based on information about the attitude of the host vehicle 11 due to tilting in the front-rear and left-right directions and information about the degree of door opening Odr. The results are then sent to the control unit 39.

The control unit 39 controls driving of the motor actuator 19 so that the target door opening/closing speed Vdrtg set by the setting unit 35 is obtained at the current degree of door opening Odr, which changes sequentially.

Specifically, the control unit 39 executes a speed tracking control so that the door opening/closing speed Vdr at the current degree of door opening Odr becomes closer to the target door opening/closing speed Vdrtg.

Figure 4B:
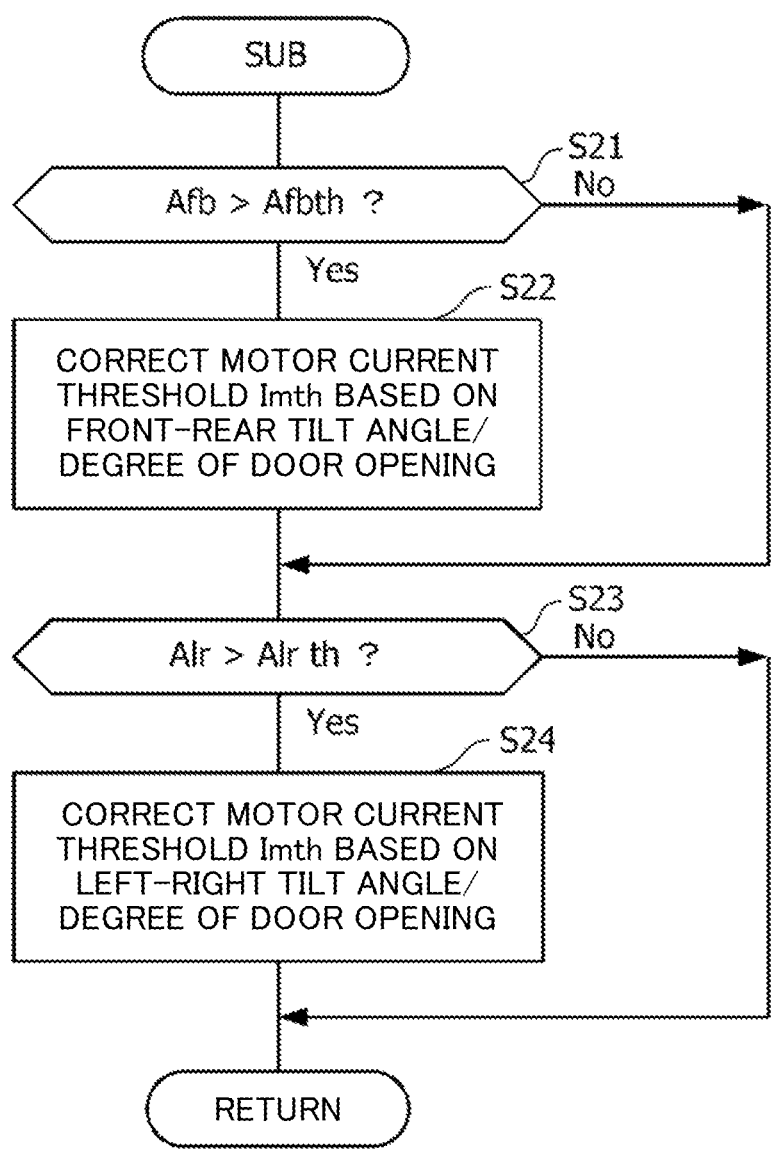
FIG. 4B is a flowchart showing a procedure for correcting the motor load current threshold among operations of the power door device.

Operation of Power Door Device 10 According to Embodiment of the Present Invention Next, how a power door device 10 according to an embodiment of the present invention work will be described, if appropriate, with reference to FIGS. 4A and 4B. FIG. 4A is a flowchart illustrating how the power door device 10 according to this embodiment works. FIG. 4B is a flowchart showing a procedure for correcting the motor load current threshold Imth among operations of the power door device 10.

Assume that the door 14 of the host vehicle 11 is in the auto-opening state, and the host vehicle 11 is tilted forward and upward (facing uphill).

In step S11 shown in FIG. 4A, the information acquisition unit 33 belonging to the door ECU 28 acquires time-series information involving the door opening/closing speed Vdr and the degree of door opening Odr based on the output signals of the Hall sensor 31, time-series information involving the vertical acceleration αdr of the host vehicle 11, and time-series information involving the front-rear tilt angle Afb and the left-right tilt angle Alr based on the output signals from the accelerometer 32.

In step S12, the setting unit 35 belonging to the door ECU 28 uses the information (see FIGS. 3A and 3B) about how the degree of door opening Odr corresponds to the door opening/closing speed Vdr to extract the door opening/closing speed Vdr corresponding to the current degree of door opening Odr. The extracted door opening/closing speed Vdr (corresponding to the current degree of door opening Odr) is set as a target door opening/closing speed Vdrtg.

In step S13, the setting unit 35 belonging to the door ECU 28 multiplies, by a predetermined coefficient X (provided that the coefficient X>1), the value according to the characteristic diagram of the relationship between the degree of door opening Odr and the motor load current value Im (see FIGS. 3C and 3D) of the host vehicle 11 in the horizontal position. The resulting multiplied value (corresponding to the current degree of door opening Odr) is set as a motor load current threshold Imth.

In a subroutine SUB, the diagnostic unit 37 belonging to the door ECU 28 corrects the motor load current threshold Imth based on the front-rear tilt angle Afb/left-right tilt angle Alr/degree of door opening Odr.

Here, the subroutine SUB is explained with reference to FIG. 4B.

In step S21 of the subroutine SUB shown in FIG. 4B, the diagnostic unit 37 belonging to the door ECU 28 determines whether or not the front-rear tilt angle Afb of the host vehicle 11 exceeds a predetermined front-rear tilt angle threshold Afbth.

If the result of the determination in step S21 indicates that the front-rear tilt angle Afb of the host vehicle 11 exceeds the predetermined front-rear tilt angle threshold Afbth (Yes in step S21), the door ECU 28 advances the processing to the next step S22.

On the other hand, if the result of the determination in step S21 indicates that the front-rear tilt angle Afb of the host vehicle 11 does not exceed the predetermined front-rear tilt angle threshold Afbth (No in step S21), the door ECU 28 jumps the processing to step S23.

In step S22 of the subroutine SUB, the diagnostic unit 37 belonging to the door ECU 28 corrects (increases/decreases) the motor load current threshold Imth based on the front-rear tilt angle Afb/current degree of door opening Odr.

Assume that (the door 14 of the host vehicle 11 is in the auto-opening state and the attitude of the host vehicle 11 is tilted forward and upward). In the diagnostic unit 37, the motor load current threshold Imth is increased and corrected based on the front-rear tilt angle Afb/current degree of door opening Odr.

In step S23 of the subroutine SUB, the diagnostic unit 37 belonging to the door ECU 28 determines whether or not the left-right tilt angle Alr of the host vehicle 11 exceeds a predetermined left-right tilt angle threshold Alrth.

If the result of the determination in step S23 indicates that the left-right tilt angle Alr of the host vehicle 11 exceeds the predetermined left-right tilt angle threshold Alrth (Yes in step S23), the door ECU 28 advances the processing to the next step S24.

On the other hand, if the result of the determination in step S23 indicates that the left-right tilt angle Alr of the host vehicle 11 does not exceed the predetermined left-right tilt angle threshold Alrth (No in step S23), the door ECU 28 jumps the processing to step S25.

In step S24 of the subroutine SUB, the diagnostic unit 37 belonging to the door ECU 28 corrects (increases/decreases) the motor load current threshold Imth based on the left-right tilt angle Alr/current degree of door opening Odr.

Assume that (the door 14 of the host vehicle 11 is in the auto-opening state and the attitude of the host vehicle 11 is tilted forward and upward). In the diagnostic unit 37, the motor load current threshold Imth is increased and corrected based on the front-rear tilt angle Afb/current degree of door opening Odr.

After that, the door ECU 28 returns the processing to the main routine shown in FIG. 4A.

Back to the main routine shown in FIG. 4A to continue the explanation. In step S14, the control unit 39 belonging to the door ECU 28 controls driving of the motor actuator 19 so that the target door opening/closing speed Vdrtg set by the setting unit 35 is obtained at the current degree of door opening Odr.

Specifically, the control unit 39 executes a speed tracking control so that the door opening/closing speed Vdr at the current degree of door opening Odr becomes closer to the target door opening/closing speed Vdrtg.

Assume that (the door 14 of the host vehicle 11 is in the auto-opening state and the attitude of the host vehicle 11 is tilted forward and upward). The control unit 39 uses the front-rear tilt angle Afb/current degree of door opening Odr to correct the motor load current value Im to be higher than the value according to the characteristic diagram (see FIG. 3C) of the relationship between the degree of door opening Odr and the motor load current value Im of the host vehicle 11 in the horizontal position.

This is because in the case with the force that prevents the door 14 from being opened due to a change in the attitude of the host vehicle 11 (tilted forward and upward by 17 degrees), the motor load current value Im should be increased when compared to the value while the host vehicle 11 is in the horizontal position in order to accurately execute the speed tracking control.

Note that in the case where the door 14 is in the auto-opening state and with the force that prevents (increases the load on) the door 14 from being opened (tilted forward and upward by 17 degrees; see FIG. 3C), the magnitude of the motor load current value Im tends to increase in the region where the degree of door opening Odr is large (see the third section in FIG. 3C). This is because the larger the degree of door opening Odr, the greater the influence of the weight associated with the self-weight of the door 14 (mass of door 14×gravitational acceleration) on the motor load.

On the other hand, the door 14 may be in the auto-opening state, and the force that promotes (decreases the load on) the door 14 to be opened may act on the door 14. In this case (tilted forward and downward by 17 degrees; see FIG. 3C), the control unit 39 uses the front-rear tilt angle Afb/current degree of door opening Odr to correct the motor load current value Im to be lower than the value according to the characteristic diagram (see FIG. 3C) of the relationship between the degree of door opening Odr and the motor load current value Im of the host vehicle 11 in the horizontal position.

This is because in the case with the force that promotes the door 14 to be opened due to a change in the attitude of the host vehicle 11 (tilted forward and downward by 17 degrees), the motor load current value Im should be decreased when compared to the value while the host vehicle 11 is in the horizontal position in order to accurately execute the speed tracking control.

Note that in the case where the door 14 is in the auto-opening state and with the force that promotes (decreases the load on) the door 14 to be opened (tilted forward and downward by 17 degrees; see FIG. 3C), the magnitude of the motor load current value Im tends to decrease in the region where the degree of door opening Odr is large (see the third section in FIG. 3C). This is because the larger the degree of door opening Odr, the greater the influence of the weight associated with the self-weight of the door 14 (mass of door 14×gravitational acceleration) on the motor load.

In contrast, the door 14 of the host vehicle 11 may be in the auto-opening state, and the door 14 may be positioned upward with reference to the vehicle body 20 of the host vehicle 11. In this case (door positioned upward by 17 degrees; see FIG. 3D), the control unit 39 uses the left-right tilt angle Alr/current degree of door opening Odr to correct the motor load current value Im to be higher than the value according to the characteristic diagram (see FIG. 3D) of the relationship between the degree of door opening Odr and the motor load current value Im of the host vehicle 11 in the horizontal position.

This is because in the case with the force that prevents the door 14 from being opened due to a change in the attitude of the host vehicle 11 (the door positioned upward by 17 degrees), the motor load current value Im should be increased when compared to the value while the host vehicle 11 is in the horizontal position in order to accurately execute the speed tracking control.

Note that in the case where the door 14 is in the auto-opening state and with the force that prevents (increases the load on) the door 14 from being opened (the door is positioned upward by 17 degrees; see FIG. 3D), the magnitude of the motor load current value Im tends to increase in the region where the degree of door opening Odr is small (see the first section in FIG. 3D). This is because the smaller the degree of door opening Odr, the greater the influence of the weight associated with the self-weight of the door 14 (mass of door 14×gravitational acceleration) on the motor load.

On the other hand, the door 14 may be in the auto-opening state, and the force that promotes (decreases the load on) the door 14 to be opened may act on the door 14. In this case (door positioned downward by 17 degrees; see FIG. 3D), the control unit 39 uses the left-right tilt angle Alr/current degree of door opening Odr to correct the motor load current value Im to be lower than the value according to the characteristic diagram (see FIG. 3D) of the relationship between the degree of door opening Odr and the motor load current value Im of the host vehicle 11 in the horizontal position.

This is because in the case with the force that promotes the door 14 to be opened due to a change in the attitude of the host vehicle 11 (the door positioned downward by 17 degrees), the motor load current value Im should be decreased when compared to the value while the host vehicle 11 is in the horizontal position in order to accurately execute the speed tracking control.

Note that in the case where the door 14 is in the auto-opening state and with the force that promotes (decreases the load on) the door 14 to be opened (the door is positioned downward by 17 degrees; see FIG. 3D), the magnitude of the motor load current value Im tends to decrease in the region where the degree of door opening Odr is small (see the first section in FIG. 3D). This is because the smaller the degree of door opening Odr, the greater the influence of the weight associated with the self-weight of the door 14 (mass of door 14×gravitational acceleration) on the motor load.

Next, the case where the door 14 is in the auto-closing state will be described. The door 14 may be in the auto-closing state, and the force that prevents (increases the load on) the door 14 from being closed may act on the door 14. In this case (tilted forward and downward by 17 degrees; see FIG. 3E), the control unit 39 uses the front-rear tilt angle Afb/current degree of door opening Odr to correct the motor load current value Im to be higher than the value according to the characteristic diagram (see FIG. 3E) of the relationship between the degree of door opening Odr and the motor load current value Im of the host vehicle 11 in the horizontal position.

This is because in the case with the force that prevents the door 14 from being closed due to a change in the attitude of the host vehicle 11 (tilted forward and downward by 17 degrees), the motor load current value Im should be increased when compared to the value while the host vehicle 11 is in the horizontal position in order to accurately execute the speed tracking control.

Note that in the case where the door 14 is in the auto-closing state and with the force that prevents (increases the load on) the door 14 from being closed (tilted forward and downward by 17 degrees; see FIG. 3E), the magnitude of the motor load current value Im tends to increase in the region where the degree of door opening Odr is large (see the forth section in FIG. 3E). This is because the larger the degree of door opening Odr, the greater the influence of the weight associated with the self-weight of the door 14 (mass of door 14×gravitational acceleration) on the motor load.

On the other hand, the door 14 may be in the auto-closing state, and the force that promotes (decreases the load on) the door 14 to be closed may act on the door 14. In this case (tilted forward and upward by 17 degrees; see FIG. 3E), the control unit 39 uses the front-rear tilt angle Afb/current degree of door opening Odr to correct the motor load current value Im to be lower than the value according to the characteristic diagram (see FIG. 3E) of the relationship between the degree of door opening Odr and the motor load current value Im of the host vehicle 11 in the horizontal position.

This is because in the case with the force that promotes the door 14 to be closed due to a change in the attitude of the host vehicle 11 (tilted forward and upward by 17 degrees), the motor load current value Im should be decreased when compared to the value while the host vehicle 11 is in the horizontal position in order to accurately execute the speed tracking control.

Note that in the case where the door 14 is in the auto-closing state and with the force that promotes (decreases the load on) the door 14 to be closed (tilted forward and upward by 17 degrees; see FIG. 3E), the magnitude of the motor load current value Im tends to decrease in the region where the degree of door opening Odr is large (see the forth section in FIG. 3E). This is because the larger the degree of door opening Odr, the greater the influence of the weight associated with the self-weight of the door 14 (mass of door 14×gravitational acceleration) on the motor load.

In contrast, the door 14 of the host vehicle 11 may be in the auto-closing state, and the door 14 may be positioned downward with reference to the vehicle body 20 of the host vehicle 11. In this case (door positioned downward by 17 degrees; see FIG. 3F), the control unit 39 uses the left-right tilt angle Alr/current degree of door opening Odr to correct the motor load current value Im to be higher than the value according to the characteristic diagram (see FIG. 3F) of the relationship between the degree of door opening Odr and the motor load current value Im of the host vehicle 11 in the horizontal position.

This is because in the case with the force that prevents the door 14 from being closed due to a change in the attitude of the host vehicle 11 (the door positioned downward by 17 degrees), the motor load current value Im should be increased when compared to the value while the host vehicle 11 is in the horizontal position in order to accurately execute the speed tracking control.

Note that in the case where the door 14 is in the auto-closing state and with the force that prevents (increases the load on) the door 14 from being closed (the door is positioned downward by 17 degrees; see FIG. 3F), the magnitude of the motor load current value Im tends to increase in the region where the degree of door opening Odr is small (see the sixth section in FIG. 3F). This is because the smaller the degree of door opening Odr, the greater the influence of the weight associated with the self-weight of the door 14 (mass of door 14×gravitational acceleration) on the motor load.

On the other hand, the door 14 may be in the auto-closing state, and the force that promotes (decreases the load on) the door 14 to be closed may act on the door 14. In this case (door positioned upward by 17 degrees; see FIG. 3F), the control unit 39 uses the left-right tilt angle Alr/current degree of door opening Odr to correct the motor load current value Im to be lower than the value according to the characteristic diagram (see FIG. 3F) of the relationship between the degree of door opening Odr and the motor load current value Im of the host vehicle 11 in the horizontal position.

This is because in the case with the force that promotes the door 14 to be closed due to a change in the attitude of the host vehicle 11 (the door is positioned upward by 17 degrees), the motor load current value Im should be decreased when compared to the value while the host vehicle 11 is in the horizontal position in order to accurately execute the speed tracking control.

Note that in the case where the door 14 is in the auto-closing state and with the force that promotes (decreases the load on) the door 14 to be closed (the door is positioned upward by 17 degrees; see FIG. 3F), the magnitude of the motor load current value Im tends to decrease in the region where the degree of door opening Odr is small (see the sixth section in FIG. 3F). This is because the smaller the degree of door opening Odr, the greater the influence of the weight associated with the self-weight of the door 14 (mass of door 14×gravitational acceleration) on the motor load.

Next, in step S15, the first determination module 41 of the diagnostic unit 37 belonging to the door ECU 28 makes a first determination as to whether or not the motor load current value Im exceeds the motor load current threshold Imth after corrected by the subroutine SUB If the result of the first determination in step S15 indicates that the motor load current value Im does not exceed the motor load current threshold value Imth after corrected by the subroutine SUB (No in step S15), the door ECU 28 returns the processing to the beginning and executes the subsequent processing sequentially.

If the result of the first determination in step S15 indicates that the motor load current value Im exceeds the motor load current threshold value Imth after corrected by the subroutine SUB (Yes in step S15), the door ECU 28 advances the processing to the next step S16.

In step S16, the second determination module 43 of the diagnostic unit 37 belonging to the door ECU 28 makes a second determination as to whether or not the vertical acceleration αdr of the host vehicle 11 exceeds a predetermined acceleration threshold αdrth.

If the result of the second determination in step S16 indicates that the vertical acceleration αdr of the host vehicle 11 does not exceed the predetermined acceleration threshold αdrth, the door ECU 28 advances the processing to the next step S17.

If the result of the second determination in step S16 indicates that the vertical acceleration αdr of the host vehicle 11 exceeds the predetermined acceleration threshold αdrth, the door ECU 28 jumps the processing to step S18.

In step S17, the diagnostic unit 37 belonging to the door ECU 28 diagnoses an abnormality where an overload condition has occurred at the door 14. After that, the door ECU 28 terminates the sequence of processes.

In step S18, the diagnostic unit 37 belonging to the door ECU 28 defers (does not make) the abnormality diagnosis where an overload condition has occurred at the door 14. After that, the door ECU 28 returns the processing to the beginning, and the subsequent processes are executed sequentially.

Advantages of Power Door Device 10 According to Embodiment of the Present Invention The following describes advantages of each power door device 10 according to an embodiment of the present invention.

The power door device 10 based on the first aspect includes:
- a motor actuator 19 configured to open/close a door 14 of a host vehicle 11;
- a control unit 39 configured to control driving of the motor actuator 19;
- an information acquisition unit 33 configured to acquire information about each of vertical acceleration αdr, namely acceleration of the host vehicle 11 in a vertical direction, and a motor load current value Im (motor load) for the motor actuator 19; and
- a diagnostic unit 37 configured to make a first determination as to whether or not the motor load current value Im (motor load) exceeds a predetermined motor load current threshold Imth (load threshold) and a second determination as to whether or not the vertical acceleration αdr exceeds a predetermined acceleration threshold αdrth, and diagnose, based on results of the first and second determinations, whether or not an overload condition has occurred at the door 14.

When the motor load current value Im (motor load) exceeds the motor load current threshold Imth (load threshold) as a result of the first determination, the diagnostic unit 37 diagnoses an abnormality where an overload condition has occurred at the door 14. On the other hand, when the vertical acceleration αdr exceeds the acceleration threshold αdrth as a result of the second determination, the above abnormality diagnosis is deferred. This configuration has been adopted.

According to the power door device 10 based on the first aspect, the diagnostic unit 37 diagnoses an abnormality where an overload condition has occurred at the door 14 when the motor load current value Im (motor load) exceeds the motor load current threshold value Imth (load threshold) as a result of the first determination. Here, when the vertical acceleration αdr exceeds the acceleration threshold αdrth as a result of the second determination, the above abnormality diagnosis is deferred. Therefore, the diagnosis result of the overload condition can be obtained quickly and accurately without requiring idle time (waiting time) before the diagnosis result is finally determined. In addition, according to the power door device 10 based on the first aspect, the power door device 10 can contribute to improved comfortability by improving the ease of entering and exiting the vehicle cabin.

The power door device 10 according to the second aspect may also adopt the configuration of the power door device 10 according to the first aspect, wherein the information acquisition unit 33 further acquires information about the attitude of the host vehicle 11, which information including at least one of tilting in the front-rear direction or in the left-right direction, and the diagnostic unit 37 uses the information about the attitude of the host vehicle 11 to correct the motor load current threshold Imth (load threshold), and uses the motor load current threshold Imth after the correction to make the above first determination.

According to the power door device 10 based on the second aspect, the diagnostic unit 37 uses the information about the attitude of the host vehicle 11 to correct the motor load current threshold Imth (load threshold), and uses the motor load current threshold Imth after the correction to make the above first determination. Therefore, compared to the power door device 10 based on the first aspect, the influence of external disturbance (change in the attitude of the host vehicle 11) on the abnormality diagnosis results can be suppressed, thereby contributing to improving the accuracy of the abnormality diagnosis.

The power door device 10 according to the third aspect may adopt the configuration of the power door device 10 based on the second aspect, wherein the door is a swing type door 14 configured to open and close by being pivoted on hinge mechanisms 13A and 13B provided on the vehicle body 20 of the host vehicle 11, the information acquisition unit 33 further acquires information on the degree of door opening, namely the degree of opening of the door, and the diagnostic unit 37 uses the information about the degree of door opening Odr to correct the motor load current threshold Imth (load threshold), and uses the motor load current threshold Imth after the correction to make the first determination.

According to the power door device 10 based on the third aspect, the diagnostic unit 37 uses the information about the degree of door opening Odr to correct the motor load current threshold Imth (load threshold), and uses the motor load current threshold Imth after the correction to make the first determination. Therefore, compared to the power door device 10 based on the second aspect, the influence of external disturbance (change in the degree of door opening Odr) on the abnormality diagnosis results can be suppressed, thereby contributing to improving the accuracy of the abnormality diagnosis.

The power door device 10 according to the fourth aspect may adopt the configuration of the power door device 10 based on the third aspect, wherein the information acquisition unit 33 further acquires information about the attitude of the host vehicle 11 due to tilting in the front-rear direction, and the diagnostic unit 37 uses the information about the attitude of the host vehicle 11 due to tilting in the front-rear direction and the information about the degree of door opening Odr to correct the motor load current threshold Imth (load threshold), and uses the motor load current threshold Imth after the correction to make the first determination.

According to the power door device 10 based on the fourth aspect, the diagnostic unit 37 uses the information about the attitude due to tilting in the front-rear direction and the information about the degree of door opening Odr to correct the motor load current threshold Imth (load threshold), and uses the motor load current threshold Imth after the correction to make the first determination. Therefore, compared to the power door device 10 based on the third aspect, the influence of external disturbance (change in the attitude of the host vehicle 11 due to tilting in the front-rear direction and change in the degree of door opening Odr) on the abnormality diagnosis results can be suppressed, thereby contributing to improving the accuracy of the abnormality diagnosis.

The power door device 10 according to the fifth aspect may adopt the configuration of the power door device 10 based on the fourth aspect, wherein the information acquisition unit 33 further acquires information about the attitude of the host vehicle 11 due to tilting in the left-right direction, and the diagnostic unit 37 uses the information about the attitude of the host vehicle 11 due to tilting in the front-rear and left-right directions and the information about the degree of door opening Odr to correct the motor load current threshold Imth (load threshold), and uses the motor load current threshold Imth after the correction to make the first determination.

According to the power door device 10 based on the fifth aspect, the diagnostic unit 37 uses the information about the attitude due to tilting in the front-rear and left-right directions and the information about the degree of door opening Odr to correct the motor load current threshold Imth (load threshold), and uses the motor load current threshold Imth after the correction to make the first determination. Therefore, compared to the power door device 10 based on the fourth aspect, the influence of external disturbance (change in the attitude of the host vehicle 11 due to tilting in the front-rear and left-right directions and change in the degree of door opening Odr) on the abnormality diagnosis results can be suppressed, thereby contributing to improving the accuracy of the abnormality diagnosis.

The power door device 10 according to the sixth aspect may adopt the configuration of the power door device 10 based on any one of the third to fifth aspects, further including an accelerometer 32 provided at the door 14 and configured to detect acceleration in each of three-dimensional directions including front-rear, left-right, and up-down directions, wherein the information acquisition unit 33 further acquires information about the attitude of the host vehicle 11 due to tilting in the front-rear and left-right directions on the basis of the acceleration in each of the three-dimensional directions as detected by the accelerometer 32, and the diagnostic unit 37 pre-stores information about the attitude of the host vehicle 11 when the door 14 is fully closed, and in a case where the door 14 is fully opened, uses the information about the pre-stored attitude of the host vehicle 11 to correct the motor load current threshold Imth (load threshold), and uses the motor load current threshold Imth after the correction to make the first determination.

In the power door device 10 based on the sixth aspect, when the accelerometer 32 is installed at the door 14 and the information about the attitude of the host vehicle 11 is obtained based on the information about the acceleration, detected by the accelerometer 32, in each of the three-dimensional directions including the front-rear, left-right, and up-down directions, an error in the attitude of the host vehicle 11 occurs in response to a change in the degree of door opening Odr.

In this regard, according to the power door device 10 based on the sixth aspect, information about the attitude of the host vehicle 11 when the door 14 is fully closed is pre-stored. Also, when the door 14 is in the open state, given processing is executed based on the stored attitude of the host vehicle 11. Therefore, it is possible to carry out the given processing based on the information about the attitude of the host vehicle 11 as obtained with high accuracy.

That is, the motor load current threshold Imth (load threshold) is corrected based on the information about the attitude of the host vehicle 11 as obtained with high accuracy. The motor load current threshold Imth after the correction is then used to make the first determination. Therefore, compared to the power door device 10 based on any one of the third to fifth aspects, the influence of external disturbance (change in the attitude of the host vehicle 11 due to tilting in the front-rear and left-right directions) on the abnormality diagnosis results can be suppressed. With this, an effect that contributes to improving the accuracy of abnormality diagnosis can be exerted by installing the accelerometer 32, which detects acceleration in each of the three-dimensional directions, at the door 14.

The information about the acceleration in each of the three-dimensional directions as obtained by the accelerometer 32 is not only an alternative to the tilt angle sensor as described above, but may be shared as, for instance, information related to airbag activation and information to obtain a yaw rate.

Therefore, an auxiliary advantage can be exerted to achieve the above given effects without installing any separate tilt angle sensor, airbag sensor, or yaw rate sensor.

The power door device 10 according to the seventh aspect is directed to a power door device 10 according to an embodiment of the present invention, wherein the driving of the motor actuator 19 is controlled to track the door opening/closing speed Vdr, which is set sequentially in response to a change in the degree of door opening Odr. Specifically, the power door device 10 according to the seventh aspect includes:

a motor actuator 19 configured to open/close a door 14 of a host vehicle 11;

an information acquisition unit 33 configured to acquire information about each of vertical acceleration αdr, namely acceleration of the host vehicle 11 in a vertical direction, a motor load current value Im (motor load) for the motor actuator 19, and the degree of door opening Odr, which is the degree of opening of the door 14;

a setting unit 35 configured to use the information about how the degree of door opening Odr corresponds to the door opening/closing speed Vdr to extract the door opening/closing speed Vdr corresponding to the current degree of door opening Odr and set the extracted door opening/closing speed Vdr as a target door opening/closing speed Vdrtg;

a control unit 39 configured to control driving of the motor actuator 19 so that the target door opening/closing speed Vdrtg set by the setting unit 35 is obtained at the current degree of door opening Odr; and a diagnostic unit 37 configured to make a first determination as to whether or not the motor load current value Im (motor load) exceeds a predetermined motor load current threshold Imth (load threshold) and a second determination as to whether or not the vertical acceleration αdr exceeds a predetermined acceleration threshold αdrth, and diagnose, based on results of the first and second determinations, whether or not an overload condition has occurred at the door 14.

The diagnostic unit 37 diagnoses an abnormality where an overload condition has occurred at the door 14 when the motor load current value Im (motor load) exceeds the motor load current threshold value Imth (load threshold) as a result of the first determination. Meanwhile, when the vertical acceleration αdr exceeds the acceleration threshold αdrth as a result of the second determination, the above abnormality diagnosis is deferred. This configuration has been adopted.

In the power door device 10 according to the seventh aspect, the driving of the motor actuator 19 may be controlled to track the door opening/closing speed Vdr, which is set sequentially in response to a change in the degree of door opening Odr. Under this assumption, the diagnostic unit 37 diagnoses an abnormality where an overload condition has occurred at the door 14 when the motor load current value Im (motor load) exceeds the motor load current threshold value Imth (load threshold) as a result of the first determination. Here, when the vertical acceleration αdr exceeds the acceleration threshold αdrth as a result of the second determination, the above abnormality diagnosis is deferred. Therefore, the diagnosis result of the overload condition can be obtained quickly and accurately without requiring idle time (waiting time) before the diagnosis result is finally determined in the power door device 10 in which the drive control to follow the door opening/closing speed is executed.

OTHER EMBODIMENTS

The above-described embodiments are examples to be embodied in the present invention. Accordingly, they should not be construed such that the technical scope of the present invention is limited. This is because the present invention can be put into practice, without departing from the spirit and the main features thereof, even in various embodiments.

As the doors 14 to which the power door device 10 of the present invention is applied, hinged front and rear doors provided in the vehicle 11 may be exemplified. In this regard, however, sliding doors and rear doors are also included in the scope of the technical scope of the present invention.

REFERENCE SIGNS LIST

10 Power door device
11 Vehicle (host vehicle)
13A, 13B Hinge mechanism
14 Door
19 Motor actuator
20 Vehicle body
23 Joint mechanism
25 Door motor (motor actuator)
31 Hall sensor
32 Accelerometer
33 Information acquisition unit
35 Setting unit
37 Diagnostic unit
39 Control unit
41 First determination module
43 Second determination module
αdr Vertical acceleration
αdrth Vertical acceleration threshold
Im Motor load current value (motor load)
Imth Motor load current threshold (load threshold)
Odr Degree of door opening
Vdr door opening/closing speed

The invention claimed is:

1. A power door device comprising:
a motor actuator configured to open/close a door of a host vehicle;
a control unit configured to control driving of the motor actuator;
an information acquisition unit configured to acquire information about each of vertical acceleration, namely acceleration of the host vehicle in a vertical direction, and a motor load for the motor actuator; and
a diagnostic unit configured to make a first determination as to whether or not the motor load exceeds a predetermined load threshold and a second determination as to whether or not the vertical acceleration exceeds a predetermined acceleration threshold, and diagnose, based on results of the first and second determinations, whether or not an overload condition has occurred at the door, wherein
when the motor load exceeds the load threshold as a result of the first determination, the diagnostic unit diagnoses an abnormality where the overload condition has occurred at the door, and
when the vertical acceleration exceeds the acceleration threshold, as a result of the second determination, the diagnosis of the abnormality is deferred.

2. The power door device according to claim 1, wherein
the information acquisition unit further acquires information about an attitude of the host vehicle, which information including at least one of tilting in a front-rear or left-right direction, and
the diagnostic unit uses the information about the attitude of the host vehicle to correct the load threshold and uses the load threshold after the correction to make the first determination.

3. The power door device according to claim 2, wherein
the door is a swing type door configured to open and close by being pivoted on a hinge mechanism provided on a vehicle body of the host vehicle,
the information acquisition unit further acquires information about a degree of door opening, namely a degree of opening of the door, and
the diagnostic unit uses the information about the degree of door opening to correct the load threshold and uses the load threshold after the correction to make the first determination.

4. The power door device according to claim 3, wherein
the information acquisition unit further acquires information about an attitude of the host vehicle due to tilting in a front-rear direction, and
the diagnostic unit uses the information about the attitude due to tilting in the front-rear direction and the information about the degree of door opening to correct the load threshold and uses the load threshold after the correction to make the first determination.

5. The power door device according to claim 4, wherein
the information acquisition unit further acquires information about an attitude of the host vehicle due to tilting in a left-right direction, and
the diagnostic unit uses the information about the attitude due to tilting in the front-rear and left-right directions and the information about the degree of door opening to correct the load threshold and uses the load threshold after the correction to make the first determination.

6. The power door device according to claim 3, further comprising:
an accelerometer provided at the door and configured to detect acceleration in each of three-dimensional directions including front-rear, left-right, and up-down directions, wherein
the information acquisition unit further acquires information about an attitude of the host vehicle due to tilting in front-rear and left-right directions on a basis of the acceleration in each of the three-dimensional directions as detected by the accelerometer, and
the diagnostic unit pre-stores information about an attitude of the host vehicle when the door is fully closed, and in a case where the door is fully opened, uses the information about the pre-stored attitude of the host vehicle to correct the load threshold, and uses the load threshold after the correction to make the first determination.

7. A power door device comprising:
a motor actuator configured to open/close a door of a host vehicle;
an information acquisition unit configured to acquire information about each of vertical acceleration, namely acceleration of the host vehicle in a vertical direction, a motor load for the motor actuator, and a degree of door opening, namely a degree of opening of the door;
a setting unit configured to use information about how the degree of door opening corresponds to a door opening/closing speed to extract the door opening/closing speed corresponding to the current degree of door opening and set the extracted door opening/closing speed as a target door opening/closing speed;
a control unit configured to control driving of the motor actuator so that the target door opening/closing speed set by the setting unit is obtained at the current degree of door opening; and
a diagnostic unit configured to make a first determination as to whether or not the motor load exceeds a predetermined load threshold and a second determination as to whether or not the vertical acceleration exceeds a predetermined acceleration threshold, and diagnose, based on results of the first and second determinations, whether or not an overload condition has occurred at the door, wherein
when the motor load exceeds the load threshold as a result of the first determination, the diagnostic unit diagnoses an abnormality where the overload condition has occurred at the door, and
when the vertical acceleration exceeds the acceleration threshold as a result of the second determination, the diagnosis of the abnormality is deferred.

8. The power door device according to claim 4, further comprising:
an accelerometer provided at the door and configured to detect acceleration in each of three-dimensional directions including front-rear, left-right, and up-down directions, wherein
the information acquisition unit further acquires information about an attitude of the host vehicle due to tilting in front-rear and left-right directions on a basis of the acceleration in each of the three-dimensional directions as detected by the accelerometer, and
the diagnostic unit pre-stores information about an attitude of the host vehicle when the door is fully closed, and in a case where the door is fully opened, uses the information about the pre-stored attitude of the host vehicle to correct the load threshold, and uses the load threshold after the correction to make the first determination.

9. The power door device according to claim 5, further comprising:
an accelerometer provided at the door and configured to detect acceleration in each of three-dimensional directions including front-rear, left-right, and up-down directions, wherein
the information acquisition unit further acquires information about an attitude of the host vehicle due to tilting in front-rear and left-right directions on a basis of the acceleration in each of the three-dimensional directions as detected by the accelerometer, and
the diagnostic unit pre-stores information about an attitude of the host vehicle when the door is fully closed, and in a case where the door is fully opened, uses the information about the pre-stored attitude of the host vehicle to correct the load threshold, and uses the load threshold after the correction to make the first determination.

10. The power door device according to claim 1, wherein
the diagnostic unit generates an abnormal signal when the motor load exceeds the load threshold and the vertical acceleration does not exceed the acceleration threshold, and
the control unit includes an abnormal state control unit, which performs an abnormal state dealing control in response to the abnormal signal from the diagnostic unit during controlling the driving of the motor actuator.

11. The power door device according to claim 10, wherein the abnormal state dealing control includes abnormal state dealing control includes: emitting an alarm sound by a buzzer; stopping the door opening or closing; and inversing the direction of the door closing or opening.

12. The power door device according to claim 7, wherein
the diagnostic unit generates an abnormal signal when the motor load exceeds the load threshold as the result of the first determination, the diagnostic unit diagnoses the abnormality where the overload condition has occurred at the door, and when the vertical acceleration exceeds the acceleration threshold as the result of the second determination, the diagnostic unit does not generate the abnormal signal, and
the control unit includes an abnormal state control unit, which performs an abnormal state dealing control in response to the abnormal signal from the diagnostic unit during controlling the driving of the motor actuator.

13. The power door device according to claim 12, wherein the abnormal state dealing control includes abnormal state dealing control includes: emitting an alarm sound by a buzzer; stopping the door opening or closing; and inversing the direction of the door closing or opening.

* * * * *